(12) United States Patent
Lee et al.

(10) Patent No.: US 11,985,719 B2
(45) Date of Patent: May 14, 2024

(54) METHOD AND DEVICE FOR PERFORMING PC5 RRC CONNECTION-BASED HARQ FEEDBACK IN NR V2X

(71) Applicant: LG ELECTRONICS INC., Seoul (KR)

(72) Inventors: Jongyoul Lee, Seoul (KR); Giwon Park, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 380 days.

(21) Appl. No.: 17/594,635

(22) PCT Filed: Apr. 27, 2020

(86) PCT No.: PCT/KR2020/005511
§ 371 (c)(1),
(2) Date: Oct. 25, 2021

(87) PCT Pub. No.: WO2020/218903
PCT Pub. Date: Oct. 29, 2020

(65) Prior Publication Data
US 2022/0183092 A1 Jun. 9, 2022

Related U.S. Application Data

(60) Provisional application No. 62/847,903, filed on May 14, 2019.

(30) Foreign Application Priority Data

Apr. 25, 2019 (KR) .................. 10-2019-0048481
May 8, 2019 (KR) .................. 10-2019-0053463
Jun. 5, 2019 (KR) .................. 10-2019-0066341

(51) Int. Cl.
*H04W 76/14* (2018.01)
*H04L 1/1812* (2023.01)
(Continued)

(52) U.S. Cl.
CPC .......... *H04W 76/14* (2018.02); *H04L 1/1812* (2013.01); *H04W 72/0446* (2013.01);
(Continued)

(58) Field of Classification Search
CPC . H04W 76/14; H04W 72/0446; H04W 72/20; H04W 76/20; H04W 92/18;
(Continued)

(56) References Cited

U.S. PATENT DOCUMENTS

2020/0313804 A1* 10/2020 Ryu ...................... H04W 72/20
2021/0219105 A1* 7/2021 Fan ......................... H04W 4/40

FOREIGN PATENT DOCUMENTS

KR 20170132288 12/2017
WO 2018062857 4/2018

OTHER PUBLICATIONS

"Discussion on NR V2X HARQ mechanism", R1-1901146, ITL, Jan. 2019, pp. 1-5 (Year: 2019).*
(Continued)

*Primary Examiner* — Habte Mered
(74) *Attorney, Agent, or Firm* — LEE, HONG, DEGERMAN, KANG & WAIMEY

(57) ABSTRACT

An operating method of a first device (100) in a wireless communication system is proposed. The method may comprise the steps of: receiving a PSSCH from a second device (200); on the basis of whether or not PC5 RRC connection exists between the first device (100) and the second device (200), determining an option associated with HARQ feedback; and performing the HARQ feedback through a PSFCH associated with the PSSCH on the basis of the option associated with the HARQ feedback.

15 Claims, 25 Drawing Sheets

(51) Int. Cl.
  *H04W 72/0446*  (2023.01)
  *H04W 72/20*  (2023.01)
  *H04W 76/20*  (2018.01)
  *H04W 92/18*  (2009.01)

(52) U.S. Cl.
  CPC ........... *H04W 72/20* (2023.01); *H04W 76/20* (2018.02); *H04W 92/18* (2013.01)

(58) Field of Classification Search
  CPC ......... H04W 4/08; H04W 4/40; H04W 24/10; H04W 28/02; H04L 1/1812; H04L 1/186; H04L 1/00; H04L 5/00; H04L 2001/0093
  See application file for complete search history.

(56) References Cited

OTHER PUBLICATIONS

"QoS for NR V2X", R2-1905196, Qualcomm Incorporated, Apr. 2019, pp. 1-5 (Year: 2019).*
"Discussion on NR V2X physical layer procedure", Spreadtrum Communications, Mar. 2019, pp. 1-2 (Year: 2019).*
PCT International Application No. PCT/KR2020/005511, International Search Report dated Jul. 27, 2020, 4 pages.
Qualcomm Incorporated, "QoS for NR V2X," R2-1905196, 3GPP TSG-RAN WG2 Meeting #105bis, Apr. 2019, 7 pages.
ITL, "Discussion on NR V2X HARQ mechanism," R1-1901146, 3GPP TSG RAN WG1 Ad-Hoc Meeting 1901, Jan. 2019, 7 pages.
Spreadtrum Communications, "Discussion on NR V2X physical layer procedure," R1-1902724, 3GPP TSG RAN WG1 #96, Mar. 2019, 9 pages.

\* cited by examiner

FIG. 4
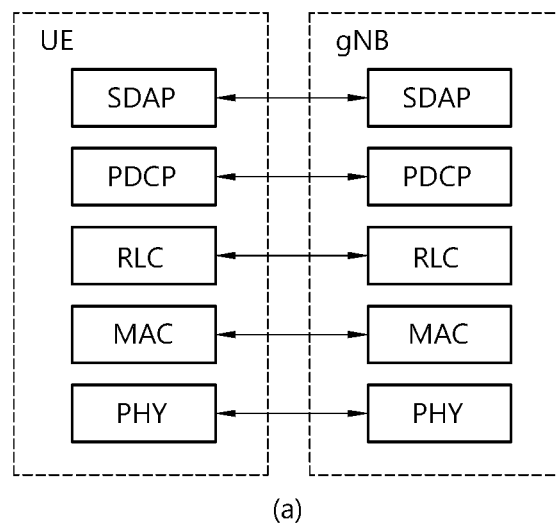
(a)
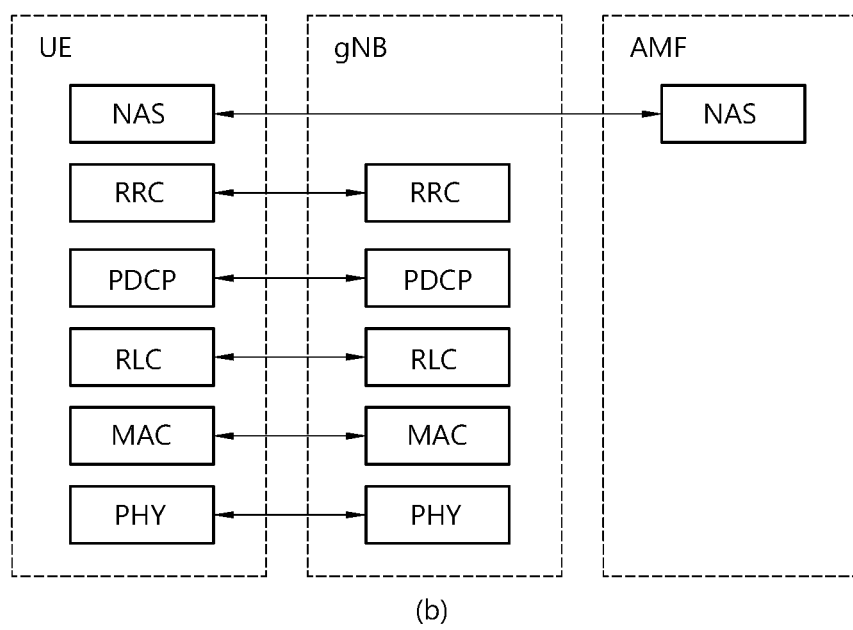
(b)

FIG. 8
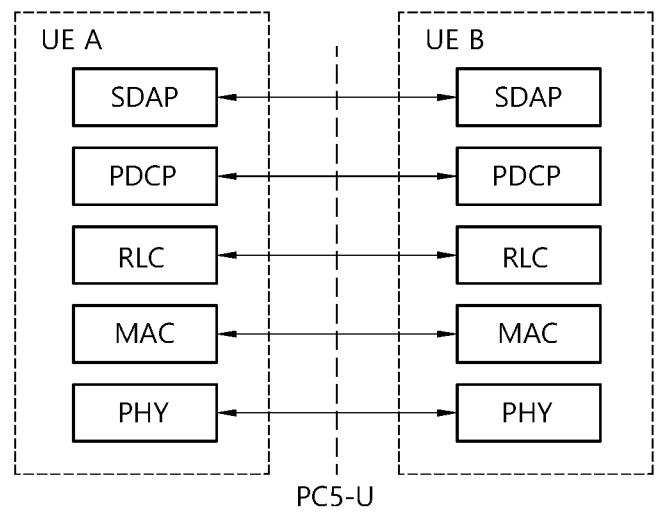
(a)
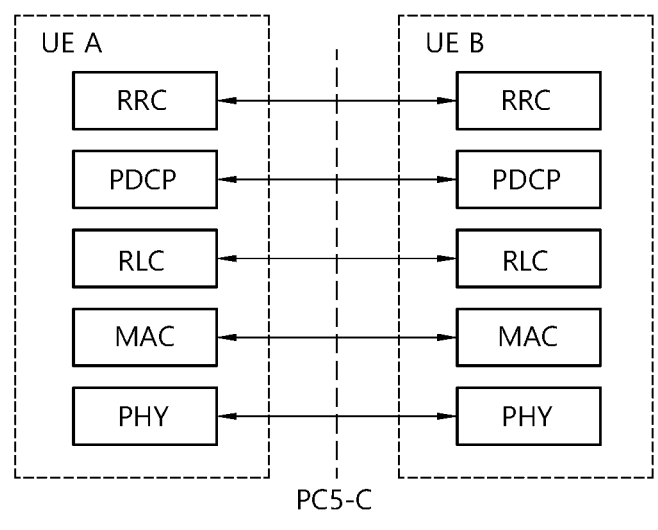
(b)

FIG. 19 transmitting a PSSCH to a first apparatus —S1910

METHOD AND DEVICE FOR PERFORMING PC5 RRC CONNECTION-BASED HARQ FEEDBACK IN NR V2X

CROSS-REFERENCE TO RELATED APPLICATIONS

This application is the National Stage filing under 35 U.S.C. 371 of International Application No. PCT/KR2020/005511, filed on Apr. 27, 2020, which claims the benefit of earlier filing date and right of priority to Korean Application Nos. 10-2019-0048481, filed on Apr. 25, 2019, 10-2019-0053463, filed on May 8, 2019, and 10-2019-0066341, filed on Jun. 5, 2019, and also claims the benefit of U.S. Provisional Application No. 62/847,903, filed on May 14, 2019, the contents of which are all hereby incorporated by reference herein in their entireties.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as BSM (Basic Safety Message), CAM (Cooperative Awareness Message), and DENM (Decentralized Environmental Notification Message) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Solutions

According to an embodiment, a method of operating the first apparatus 100 in a wireless communication system is proposed. The method comprises: receiving a PSSCH from a second apparatus 200; determining an option related to HARQ feedback based on whether a PC5 RRC connection exists between the first apparatus 100 and the second apparatus 200; and performing the HARQ feedback through a PSFCH related to the PSSCH, based on the option related to the HARQ feedback.

Effects of the Disclosure

The user equipment (UE) may efficiently perform SL communication.

BRIEF DESCRIPTION OF THE DRAWINGS

FIG. 4 shows a radio protocol architecture, in accordance with an embodiment of the present disclosure.

FIG. 8 shows a radio protocol architecture for a SL communication, in accordance with an embodiment of the present disclosure.

FIG. 19 shows a procedure in which a second apparatus receives HARQ feedback, according to an embodiment of the present disclosure.

DESCRIPTION OF EXEMPLARY EMBODIMENTS

Figure 1:
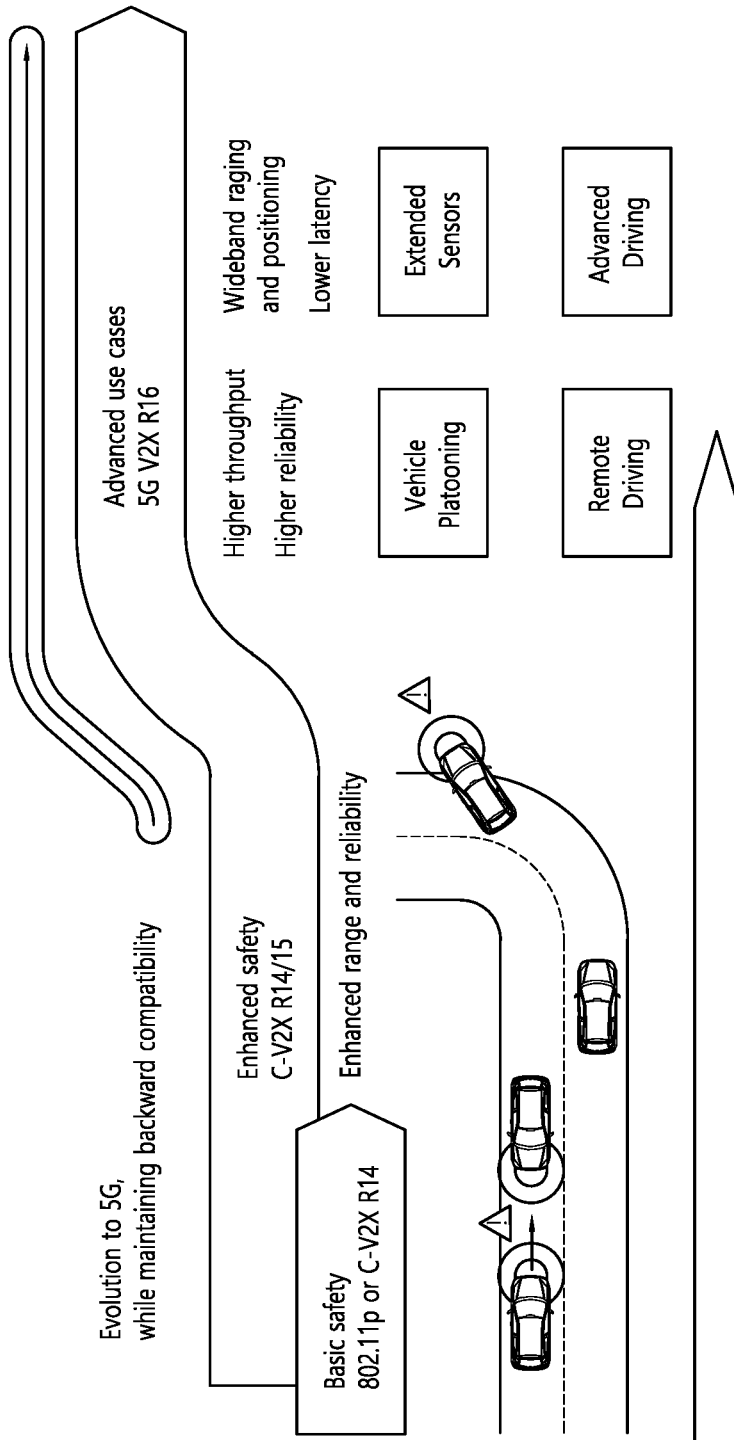
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
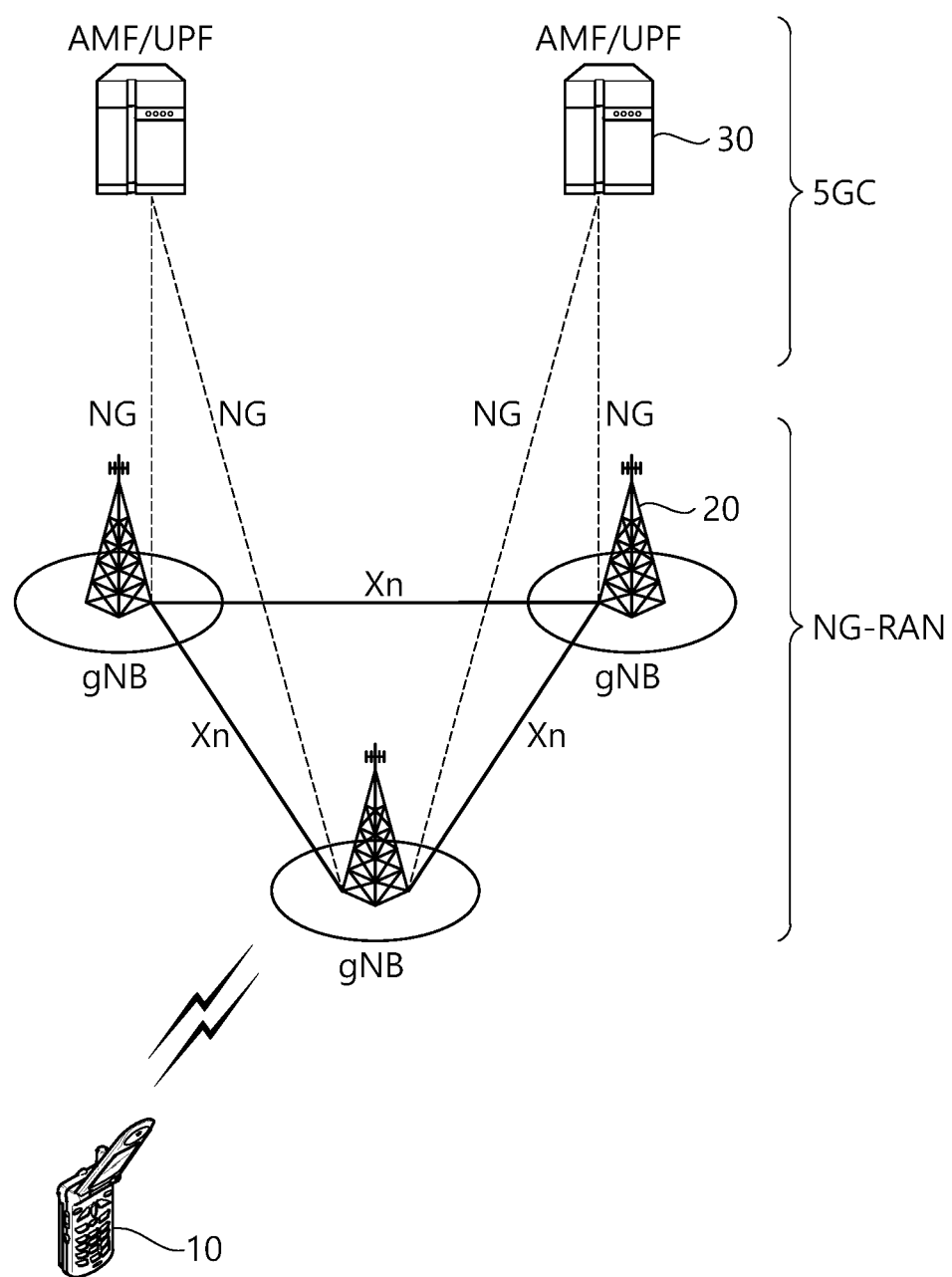
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
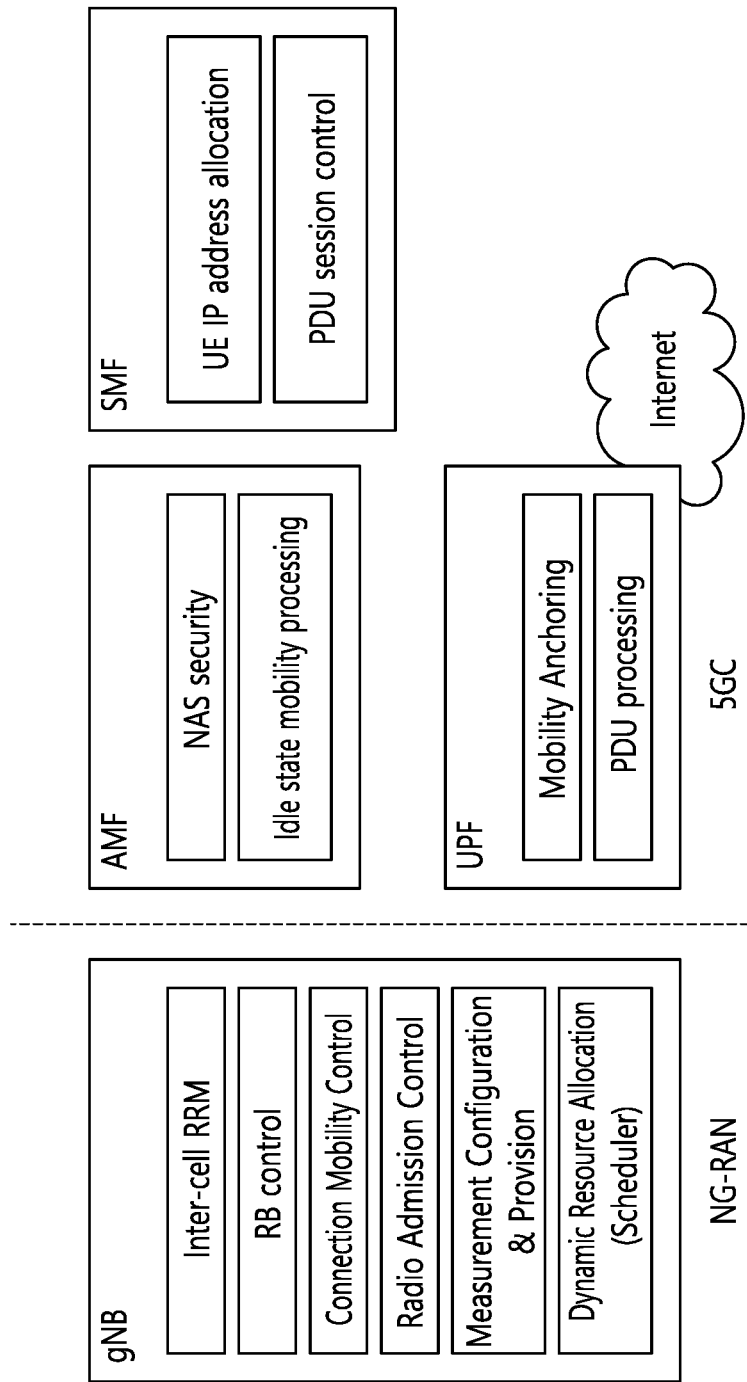
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, in accordance with an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC INACTIVE state is additionally defined, and a UE being in the RRC INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
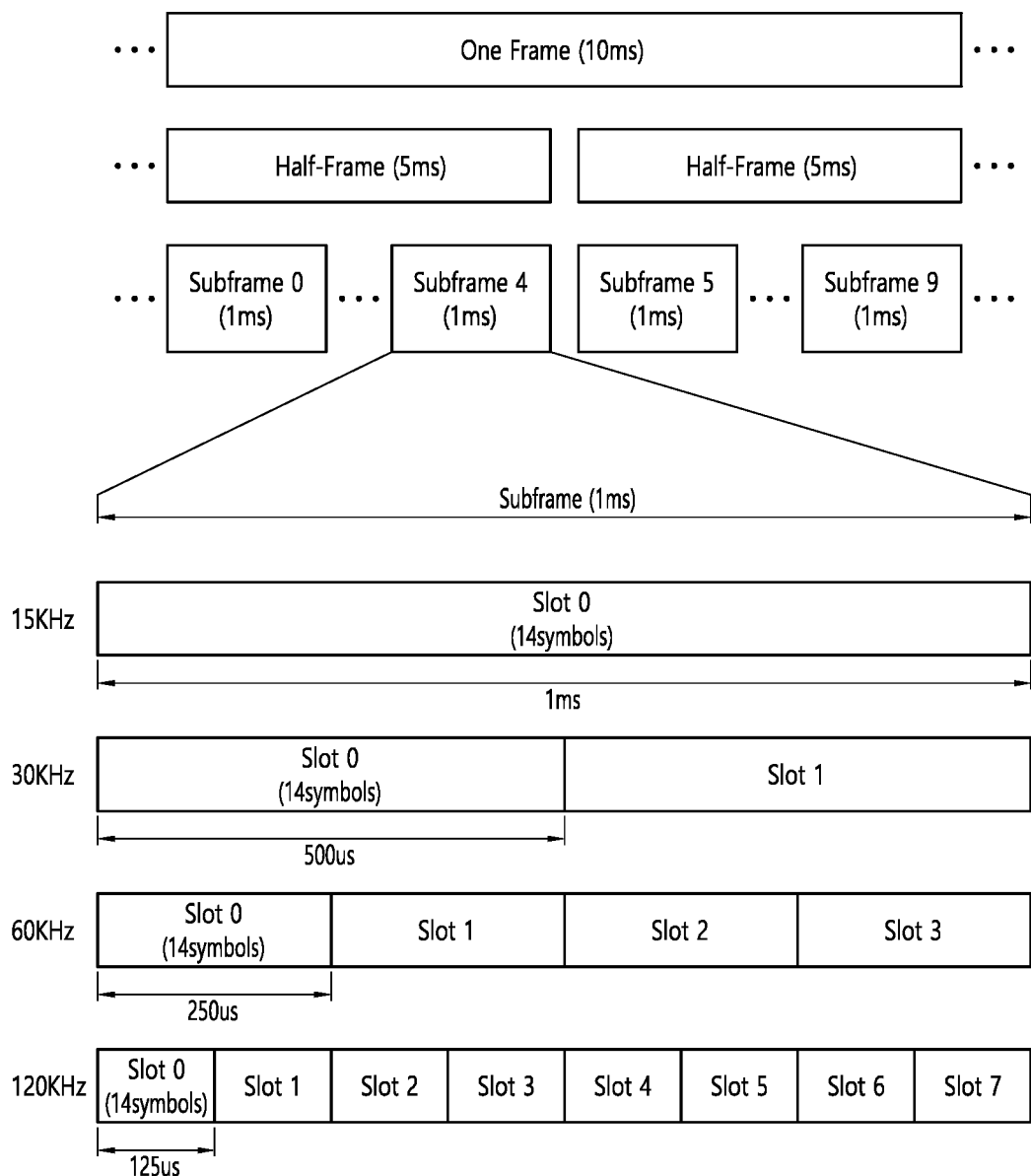
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), ($N^{frame,u}_{slot}$) a number slots per frame and a number of slots per subframe ($N^{subframe,u}_{slot}$) in accordance with an SCS configuration (u), in a case where a normal CP is used.

TABLE 1

| SCS (15 * $2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15 * $2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM (A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
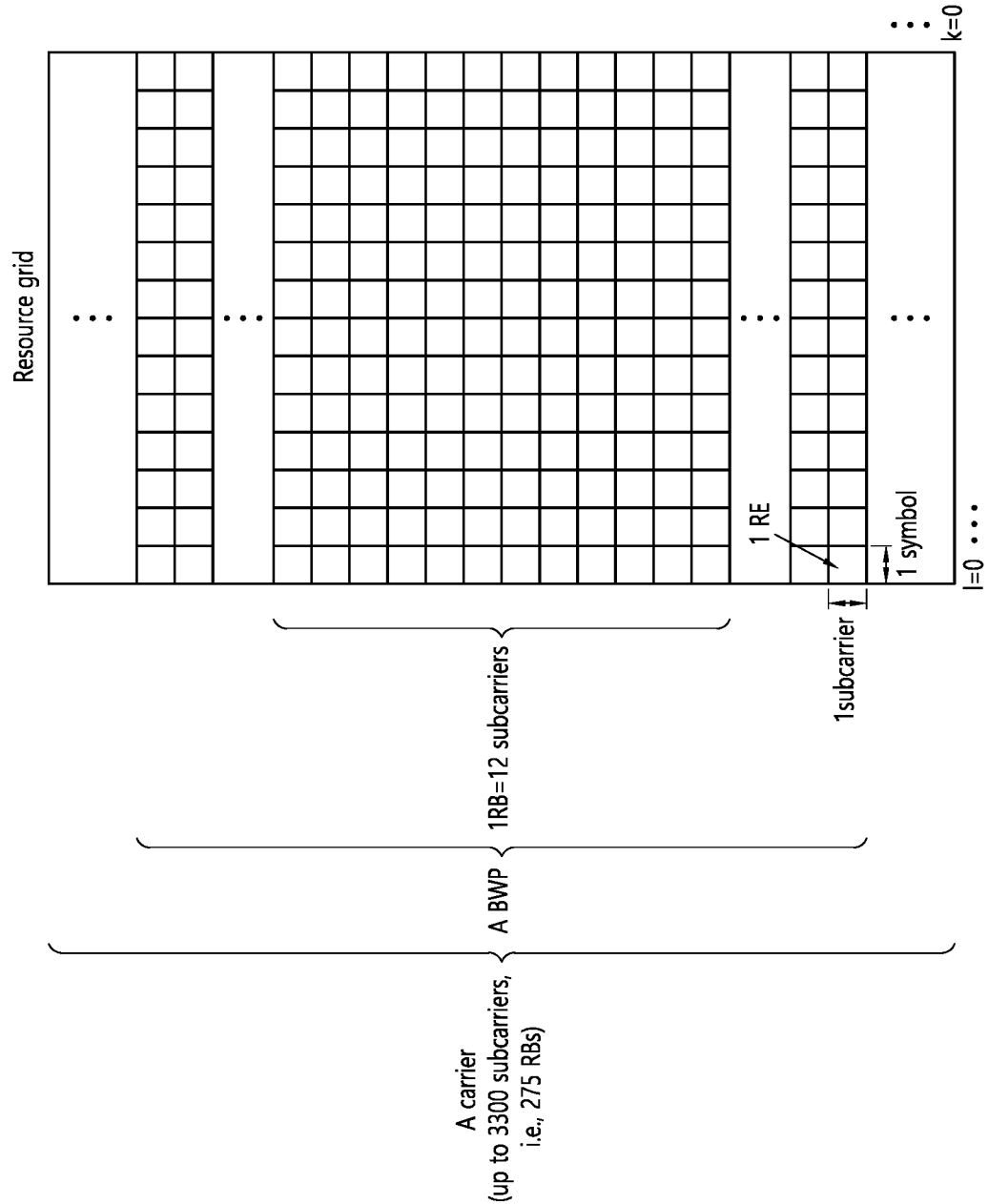
FIG. 6 shows a structure of a slot of an NR frame, in accordance with an embodiment of the present disclosure.

FIG. 6 shows a structure of a slot of an NR frame, in accordance with an embodiment of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the B S/network configures the BWP to the UE and the B S/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
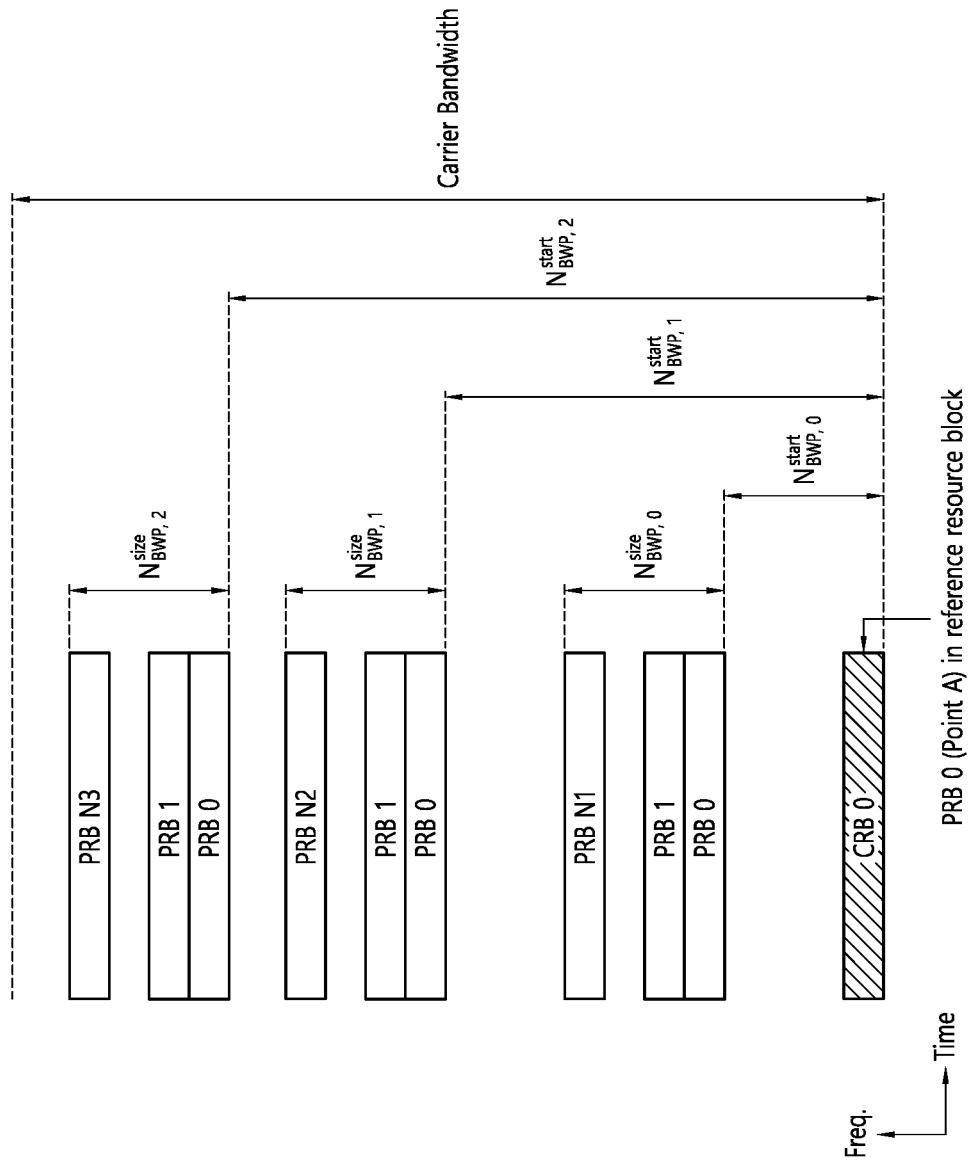
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, in accordance with an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
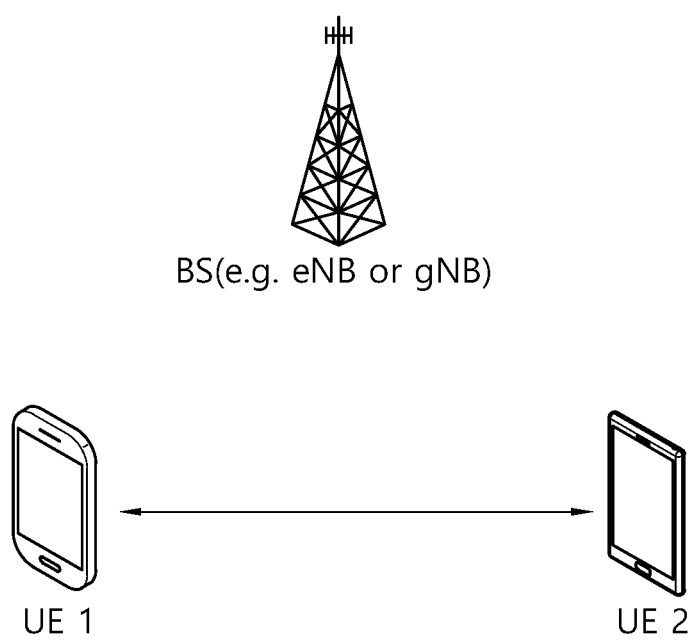
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
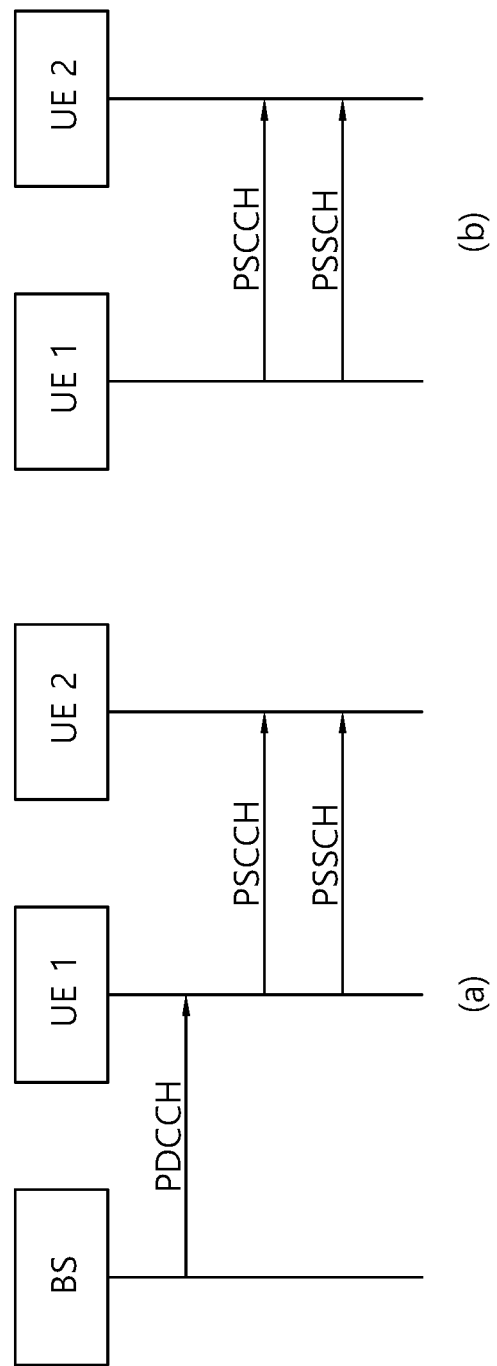
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a B S/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
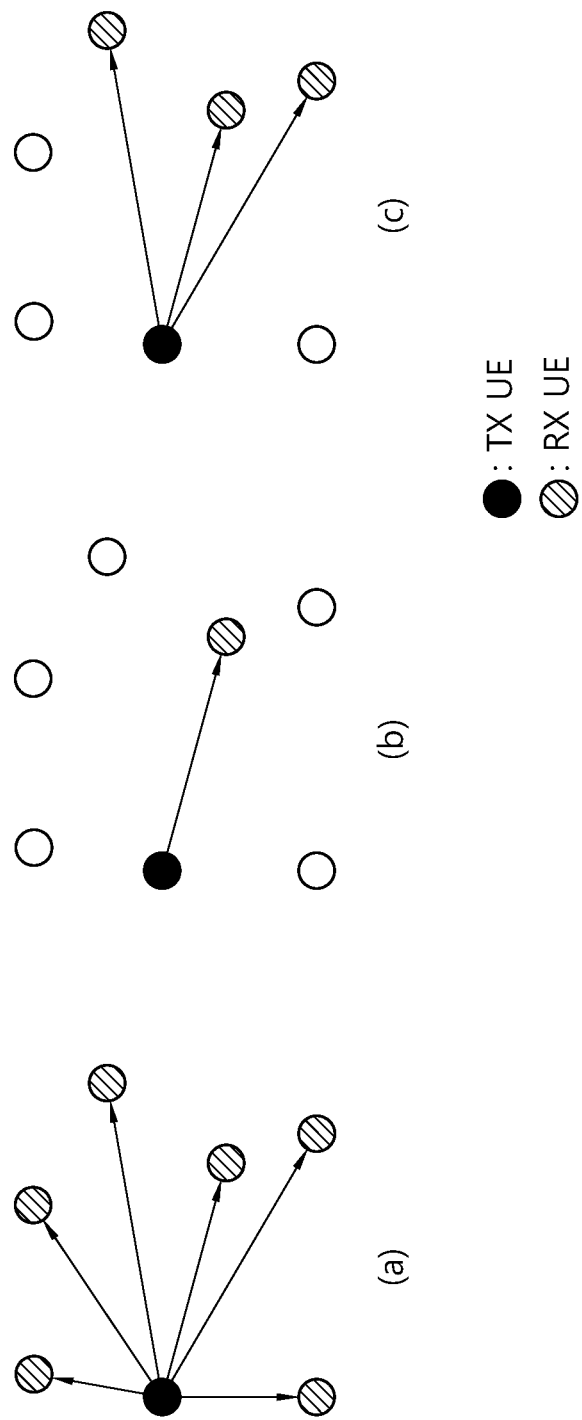
FIG. 11 shows three cast types, in accordance with an embodiment of the present disclosure.

FIG. 11 shows three cast types, in accordance with an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in a next generation system, various usage cases may be supported. For example, services for communication of self-driving vehicles, smart cars or connected cars, and so on, may be considered. For such services, each vehicle may receive and send (or transmit) information as a user equipment capable of performing communication. And, depending upon the circumstances, each vehicle may select resources for communication with the help (or assistance) of the base station or without any help (or assistance) of the base station and transmit and receive messages to and from other UEs.

Hereinafter, a hybrid automatic repeat request (HARM) procedure will be described.

An error compensation scheme is used to secure communication reliability. Examples of the error compensation scheme may include a forward error correction (FEC) scheme and an automatic repeat request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

For example, when the SL HARQ feedback is enabled for groupcast, the receiving UE may determine whether to transmit the HARQ feedback to the transmitting UE based on a transmission-reception (TX-RX) distance and/or RSRP.

For example, in the groupcast option 1, in case of the TX-RX distance-based HARQ feedback, if the TX-RX distance is less than or equal to a communication range requirement, the receiving UE may transmit HARQ feedback for the PSSCH to the transmitting UE. Otherwise, if the TX-RX distance is greater than the communication range requirement, the receiving UE may not transmit the HARQ feedback for the PSSCH to the transmitting UE. For example, the transmitting UE may inform the receiving UE of a location of the transmitting UE through SCI related to the PSSCH. For example, the SCI related to the PSSCH may be second SCI. For example, the receiving UE may estimate or obtain the TX-RX distance based on a location of the receiving UE and the location of the transmitting UE. For example, the receiving UE may decode the SCI related to the PSSCH and thus may know the communication range requirement used in the PSSCH.

For example, in case of the resource allocation mode 1, a time (offset) between the PSFCH and the PSSCH may be configured or pre-configured. In case of unicast and groupcast, if retransmission is necessary on SL, this may be indicated to a BS by an in-coverage UE which uses the PUCCH. The transmitting UE may transmit an indication to a serving BS of the transmitting UE in a form of scheduling request (SR)/buffer status report (BSR), not a form of HARQ ACK/NACK. In addition, even if the BS does not receive the indication, the BS may schedule an SL retransmission resource to the UE. For example, in case of the resource allocation mode 2, a time (offset) between the PSFCH and the PSSCH may be configured or pre-configured.

For example, from a perspective of UE transmission in a carrier, TDM between the PSCCH/PSSCH and the PSFCH may be allowed for a PSFCH format for SL in a slot. For example, a sequence-based PSFCH format having a single symbol may be supported. Herein, the single symbol may not an AGC duration. For example, the sequence-based PSFCH format may be applied to unicast and groupcast.

For example, in a slot related to a resource pool, a PSFCH resource may be configured periodically as N slot durations, or may be pre-configured. For example, N may be configured as one or more values greater than or equal to 1. For example, N may be 1, 2, or 4. For example, HARQ feedback for transmission in a specific resource pool may be transmitted only through a PSFCH on the specific resource pool.

For example, if the transmitting UE transmits the PSSCH to the receiving UE across a slot #X to a slot #N, the receiving UE may transmit HARQ feedback for the PSSCH to the transmitting UE in a slot #(N+A). For example, the slot #(N+A) may include a PSFCH resource. Herein, for example, A may be a smallest integer greater than or equal to K. For example, K may be the number of logical slots. In this case, K may be the number of slots in a resource pool. Alternatively, for example, K may be the number of physical slots. In this case, K may be the number of slots inside or outside the resource pool.

For example, if the receiving UE transmits HARQ feedback on a PSFCH resource in response to one PSSCH transmitted by the transmitting UE to the receiving UE, the receiving UE may determine a frequency domain and/or code domain of the PSFCH resource based on an implicit mechanism in a configured resource pool. For example, the receiving UE may determine the frequency domain and/or code domain of the PSFCH resource, based on at least one of a slot index related to PSCCH/PSSCH/PSFCH, a subchannel related to PSCCH/PSSCH, and/or an identifier for identifying each receiving UE in a group for HARQ feedback based on the groupcast option 2. Additionally/alternatively, for example, the receiving UE may determine the frequency domain and/or code domain of the PSFCH resource, based on at least one of SL RSRP, SINR, L1 source ID, and/or location information.

For example, if HARQ feedback transmission through the PSFCH of the UE and HARQ feedback reception through the PSFCH overlap, the UE may select any one of HARQ feedback transmission through the PSFCH and HARQ feedback reception through the PSFCH based on a priority rule. For example, the priority rule may be based on an initial priority indication of the related PSCCH/PSSCH.

For example, if HARQ feedback transmission of a UE through a PSFCH for a plurality of UEs overlaps, the UE may select specific HARQ feedback transmission based on the priority rule. For example, the priority rule may be based on an initial priority indication of the related PSCCH/PSSCH.

As described above, as groupcast communication is supported in NR SL or NR V2X, many features that must be supported for groupcast communication are being discussed. In particular, for autonomous driving and advanced V2X services, a communication technology having high reliability and low-latency needs to be supported in communication between UEs (e.g., vehicles). For example, while a block error rate (BLER) of $10^{-2}$ is required in a conventional communication system, $10^{-2}$<<BLER may be required in a next-generation communication system. For example, such as BLER of $10^{-5}$, very high reliability may be required in a next-generation communication system. In addition, since such a service may require very low latency, transmission and reception of the service should be able to be successfully completed within a very short limited time. As one of the features for this, there may be an HARQ feedback operation of a UE.

On the other hand, HARQ feedback operation between UEs may be supported in V2X communication, and also, HARQ feedback operation between UEs may be supported in groupcast communication. As described above, groupcast option 1 and groupcast option 2 may be supported in groupcast communication. For convenience of description, groupcast option 1 may be referred to as option 1, a first option, a first HARQ feedback option, or a first groupcast option, The groupcast option 2 may be referred to as option 2, a second option, a second HARQ feedback option, or a second groupcast option. For example, Table 5 shows characteristics related to HARQ feedback in groupcast communication.

TABLE 5

1. When SL HARQ feedback is enabled for groupcast, the following operations are further studied for the non-CBG case:
1) Option 1: Receiver UE transmits HARQ-NACK on PSFCH if it fails to decode the corresponding TB after decoding the associated PSCCH. It transmits no signal on PSFCH otherwise. Details are FFS including the following:
1.1) Whether to introduce an additional criterion in deciding HARQ-NACK transmission
1.2) Whether/how to handle DTX issue (i.e., transmitter UE cannot recognize the case that a receiver UE misses PSCCH scheduling PSSCH)
1.3) Issues when multiple receiver UEs transmit HARQ-NACK on the same resource
1.3.1) How to determine the presence of HARQ-NACK transmissions from receiver UEs
1.3.2) Whether/how to handle destructive channel sum effect of HARQ-NACK transmissions from multiple receiver UEs if the same signal is used
2) Option 2: Receiver UE transmits HARQ-ACK on PSFCH if it successfully decodes the corresponding TB. It transmits HARQ-NACK on PSFCH if it does not successfully decode the corresponding TB after decoding the associated PSCCH which targets the receiver UE. Details are FFS including the following:
2.1) Whether to introduce an additional criterion in deciding HARQ-ACKNACK transmission
2.2) How to determine the PSFCH resource used by each receiver UE
3) FFS whether to support SL HARQ feedback per CBG
4) Other options are not precluded.

Referring to Table 5, groupcast option 1 and groupcast option 2 may be supported in groupcast communication.

TABLE 6

In HARQ feedback for groupcast,
1) When Option 1 is used for a groupcast transmission, it is supported
1.1) all the receiver UEs share a PSFCH
1.2) FFS: a subset of the receiver UEs share a PSFCH
1.3) FFS: all or a subset of receiver UEs share a pool of PSFCH.
2) When Option 2 is used for a groupcast transmission, it is supported
2.1) each receiver UE uses a separate PSFCH for HARQ ACK/NACK.
2.2) FFS: all or a subset of receiver UEs share a PSFCH for ACK transmission and another PSFCH for NACK transmission
3) FFS on which entity and how to allocate PSFCH resource to the receiver UE(s)
4) FFS whether or not to additionally support a mixture of option 1 and option 2 for a groupcast transmission Referring to Table 6, for example, in groupcast option 1, a receiving UE may transmit HARQ feedback using a shared PSFCH resource. For example, in groupcast option 2, the receiving UE may transmit HARQ feedback using the separated PSFCH resource.

As described above, in groupcast sidelink communication, two options of HARQ feedback operation may be supported for the UE. Thus, the UE may have to choose which option should be used for its groupcast transmission.

Figure 12:
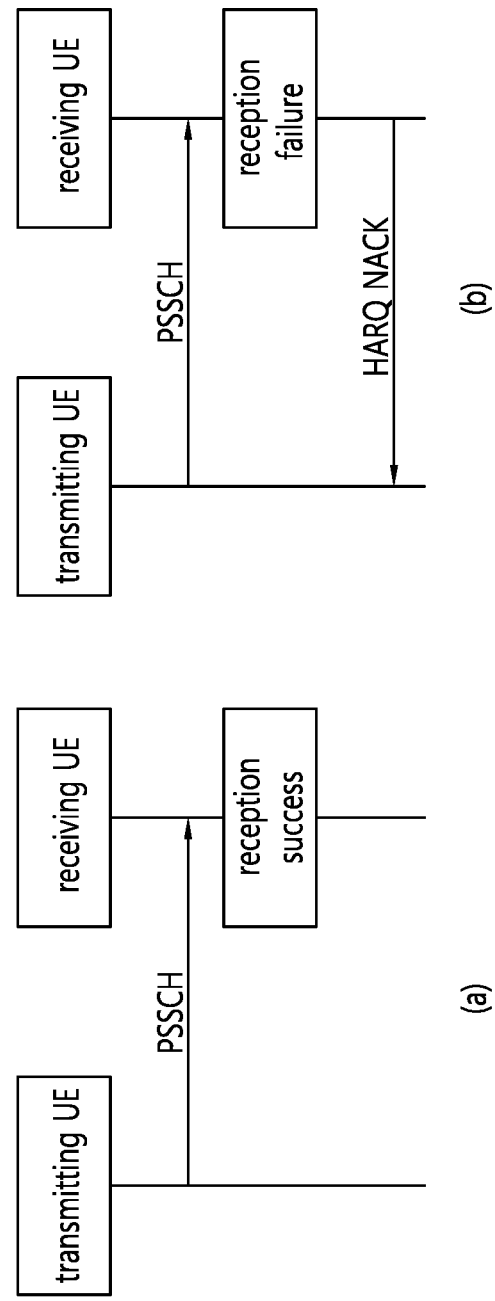
FIG. 12 shows a procedure for a receiving UE to perform HARQ feedback according to HARQ feedback option 1 according to an embodiment of the present disclosure.

FIG. 12 shows a procedure for a receiving UE to perform HARQ feedback according to HARQ feedback option 1 according to an embodiment of the present disclosure. The embodiment of FIG. 12 may be combined with various embodiments of the present disclosure.

Referring to FIG. 12, a transmitting UE and a receiving UE may perform sidelink communication. For example, the sidelink communication may be performed in a groupcast method. For example, (a) of FIG. 12 shows a procedure in which a receiving UE performs HARQ feedback according to HARQ feedback option 1. A transmitting UE may transmit a PSSCH to the receiving UE. The receiving UE may succeed in receiving the PSSCH. Since the receiving UE performs HARQ feedback according to HARQ feedback option 1, when the receiving UE succeeds in receiving the PSSCH, the HARQ ACK related to the PSSCH may not be transmitted to the transmitting UE. For example, (b) of FIG. 12 shows a procedure for a receiving UE to perform HARQ feedback according to HARQ feedback option 1. A transmitting UE may transmit a PSSCH to the receiving UE. The receiving UE may fail to receive the PSSCH. Since the receiving UE performs HARQ feedback according to HARQ feedback option 1, when the receiving UE fails to receive the PSSCH, it may transmit a HARQ NACK related to the PSSCH to the transmitting UE.

Figure 13:
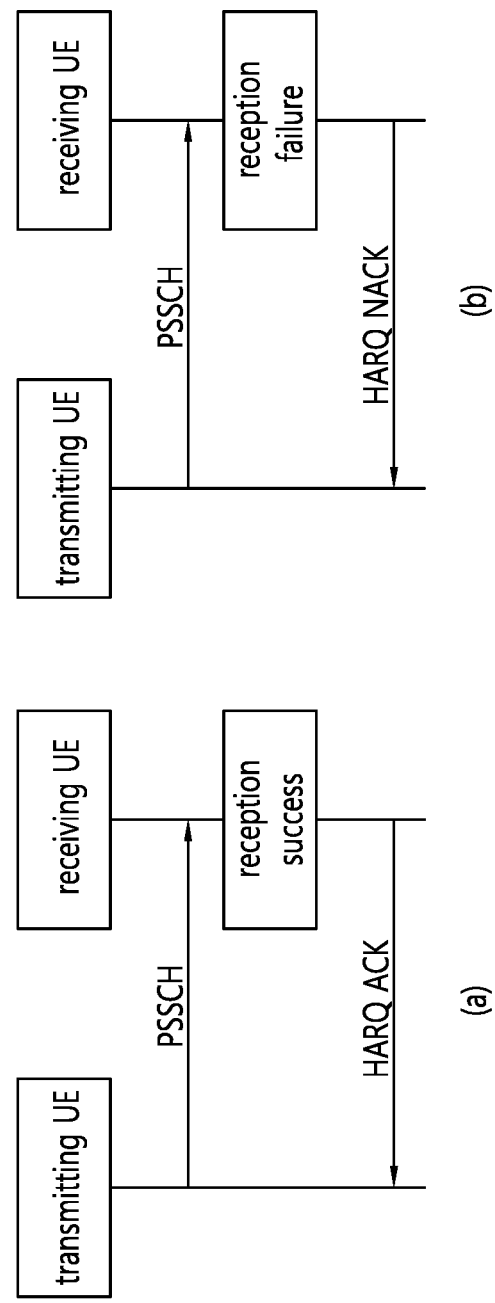
FIG. 13 shows a procedure for a receiving UE to perform HARQ feedback according to HARQ feedback option 2 according to an embodiment of the present disclosure.

FIG. 13 shows a procedure for a receiving UE to perform HARQ feedback according to HARQ feedback option 2 according to an embodiment of the present disclosure. The embodiment of FIG. 13 may be combined with various embodiments of the present disclosure.

Referring to FIG. 13, a transmitting UE and a receiving UE may perform sidelink communication. For example, the sidelink communication may be performed in a groupcast method. For example, (a) of FIG. 13 shows a procedure for a receiving UE to perform HARQ feedback according to HARQ feedback option 2. A transmitting UE may transmit the PSSCH to the receiving UE. The receiving UE may succeed in receiving the PSSCH. Since the receiving UE performs HARQ feedback according to HARQ feedback option 2, if the receiving UE succeeds in receiving the PSSCH, it may transmit a HARQ ACK related to the PSSCH to the transmitting UE. For example, (b) of FIG. 13 shows a procedure for a receiving UE to perform HARQ feedback according to HARQ feedback option 2. A transmitting UE may transmit the PSSCH to the receiving UE. The receiving UE may fail to receive the PSSCH. Since the receiving UE performs HARQ feedback according to HARQ feedback option 2, when the receiving UE fails to receive the PSSCH, it may transmit a HARQ NACK related to the PSSCH to the transmitting UE.

Figure 14:
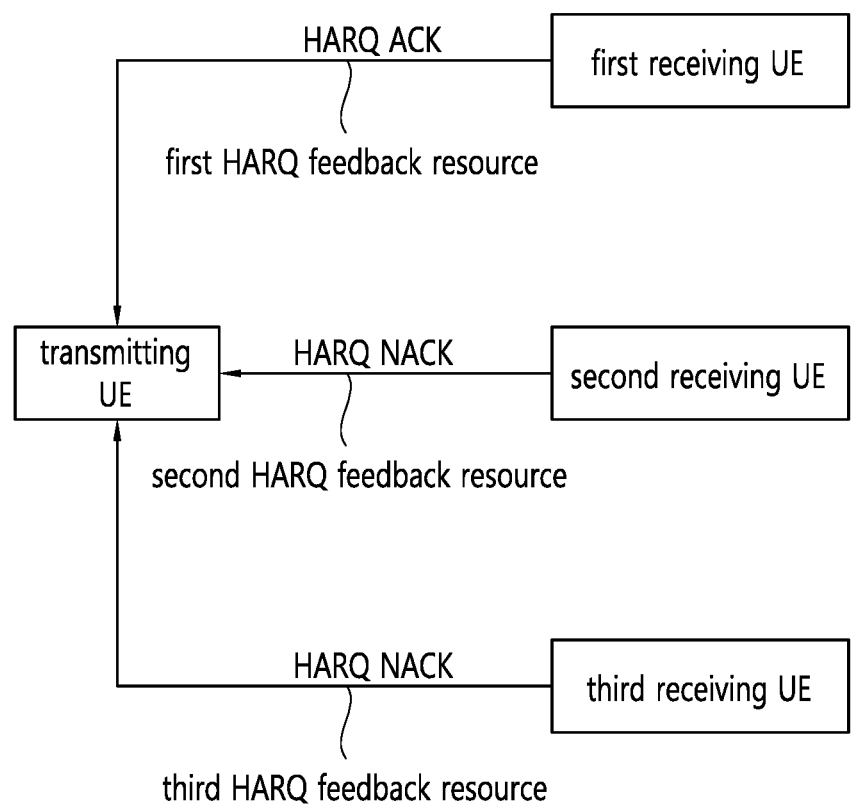
FIG. 14 shows an example in which a UE performing groupcast communication performs HARQ feedback according to HARQ feedback option 2 according to an embodiment of the present disclosure.

FIG. 14 shows an example in which a UE performing groupcast communication performs HARQ feedback according to HARQ feedback option 2 according to an embodiment of the present disclosure. The embodiment of FIG. 14 may be combined with various embodiments of the present disclosure.

Referring to FIG. 14, a transmitting UE may perform sidelink communication with a first receiving UE, a second receiving UE, and a third receiving UE. For example, the sidelink communication may be performed in a groupcast method. For example, the first receiving UE may perform HARQ feedback according to HARQ feedback option 2. The first receiving UE may transmit a HARQ ACK to the transmitting UE through a first HARQ feedback resource. For example, the second receiving UE may perform HARQ feedback according to HARQ feedback option 2. The second receiving UE may transmit a HARQ NACK to the transmitting UE through a second HARQ feedback resource. For example, the third receiving UE may perform HARQ feedback according to HARQ feedback option 2. The third receiving UE may transmit a HARQ NACK to the transmitting UE through a third HARQ feedback resource. For example, the first HARQ feedback resource, the second HARQ feedback resource, and the third HARQ feedback resource may be different resources.

Hereinafter, according to an embodiment of the present invention, A method for a UE to perform a HARQ feedback operation depending on whether the UE is establishing an RRC connection with a specific UE in its group by selecting one of two options of a HARQ feedback operation, and an apparatus supporting the same are proposed. For example, the RRC connection may include a PC5-RRC connection.

In option 2, each UE in the group may be allocated an independent HARQ resource. It's because when option 2 is applied, unlike the case where option 1 is applied, each UE belonging to the group must feedback both HARQ ACK and NACK, so that shared HARQ resources cannot be used. Then, it may be necessary to define the HARQ feedback resource to be used by a specific UE from among the HARQ feedback resources included in the set or defined HARQ feedback resource set within the group. In addition, it may be necessary to define a subject and method for allocating independent HARQ feedback resources to UEs in the group. It may be natural that the allocation of the HARQ feedback resource is performed by a TX UE. However, since 1:m RRC connection for groupcast is not defined in the current sidelink, in a groupcast without RRC connection between the transmitting UE (TX UE) and all receiving UEs (RX UE), it may be difficult for the transmitting UE to configure HARQ feedback resources of all UEs in the group. Accordingly, the above problem can be solved through a method of performing HARQ feedback by selecting a specific option among options 1 and 2 when a specific pre-configuration is pre-configured and the receiving UE satisfies the condition corresponding to the pre-configuration rather than a method that the transmitting UE allocates independent HARQ feedback resources of all receiving UEs. Hereinafter, the UE's pre-configuration information for selection of the HARQ feedback option is proposed. The pre-configuration information may require an assumption that a mixture of option 1/2 is allowed within a group.

According to an embodiment of the present disclosure, when a plurality of UEs perform groupcast communication, if a PC5 RRC connection is established between an RX UE and a TX UE in a group, the RX UE may be specified to transmit HARQ feedback in an option 2 manner. Therefore, when a PC5 RRC connection is established between the RX UE and the TX UE in the group, the RX UE may transmit HARQ feedback to the TX UE in an option 2 manner. Here, the TX UE may be a specific UE that is a counterpart to which the RX UE sends a group join message to join a specific group, or may be a leader UE pre-configured in the group. The RX UE may know whether a PC5 RRC connection with the TX UE is established. At this time, for example, when a PC5 RRC connection is established between the RX UE and the TX UE, the RX UE may perform HARQ feedback in an option 2 manner. Here, the resource on which the RX UE needs to perform HARQ feedback may be informed or indicated by the TX UE to the RX UE through a PC5 RRC message. Here, for example, the TX UE may identify all PC5 RRC-connected RX UEs in the group and may perform separation of the HARQ feedback resources of the RX UEs in the HARQ feedback resource set, and transmit information of HARQ feedback resources allocated or coordinated to a specific RX UE through a PC5 RRC message, upon receiving the information of the HARQ feedback resource, the RX UE may perform HARQ feedback to the TX UE based on the independent HARQ resource. For example, the information of the HARQ feedback resource allocated or coordinated to the specific RX UE may include frequency/time information and/or a resource index within the HARQ resource set. Here, for example, the PC5 RRC message may be in the form of additionally including information on the HARQ feedback resource to the conventional RRC message. Alternatively, for example, a new PC5 RRC message for transferring information of the HARQ feedback resource may be defined, and the TX UE may transmit the new PC5 RRC message to the RX UE. For example, the new PC5 RRC message may include a new AS layer configuration. Also, for example, a method of transferring information of the HARQ feedback resource may be as follows.

For example, a TX UE may deliver information of a HARQ feedback resource to an RX UE through a 1:1 PC5 RRC message. Or, for example, in order to reduce the signaling overhead of the TX UE, the TX UE may transmit information of the HARQ feedback resource to a plurality of RX UEs through an RRC message for groupcast. An example of the above method may be shown as shown in FIG. 15.

Figure 15:
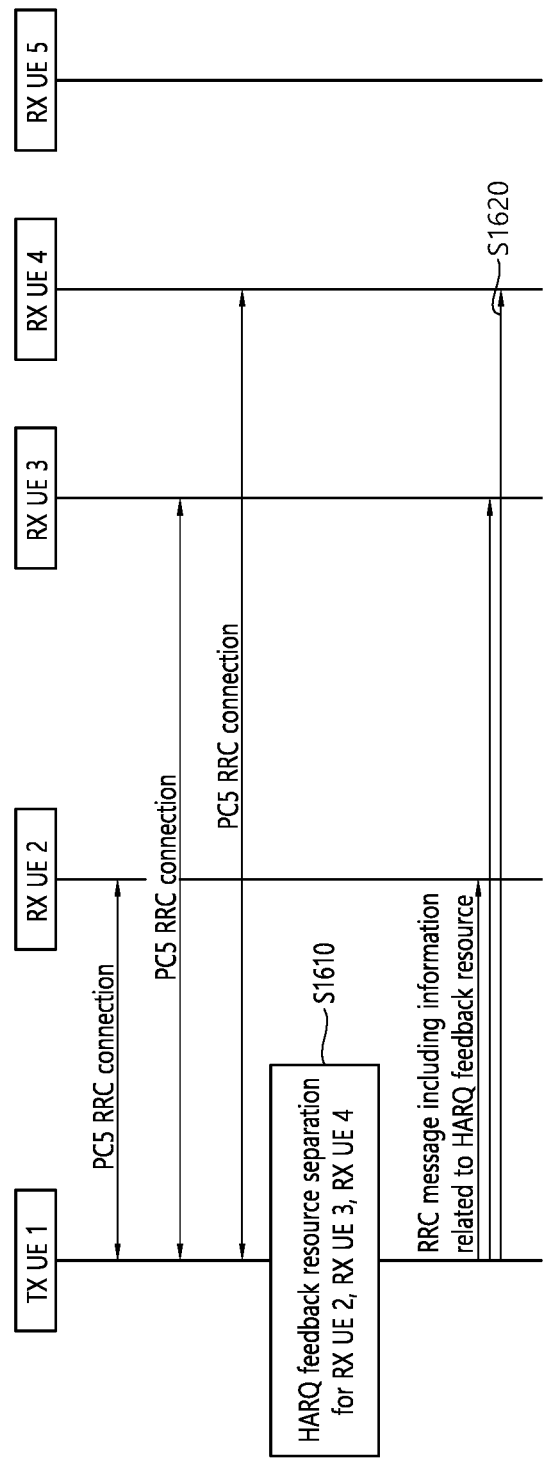
FIG. 15 shows a procedure for performing HARQ feedback by a UE performing groupcast communication according to an embodiment of the present disclosure.

FIG. 15 shows a procedure for performing HARQ feedback by a UE performing groupcast communication according to an embodiment of the present disclosure. The embodiment of FIG. 15 may be combined with various embodiments of the present disclosure.

Referring to FIG. 15, when TX UE 1 and RX UE 2 to 5 are present in the groupcast group, all UEs may join the groupcast group, in a state that the TX UE1 establishes a PC5 RRC connection with the RX UE 2, the RX UE 3, and the RX UE 4, respectively, but does not establish a PC5 RRC connection with the UE 5. In this cast, for example, in step S1610, the TX UE 1 may know that an independent or separate HARQ feedback resource for the RX UEs 2 to 4 is needed, the TE UE may separate HARQ feedback resources for RX UEs 2 to 4 from each other. And, in step S1620, the TX UE1 may transmit information of the HARQ feedback resource to the RX UEs 2 to 4 through the RRC message.

In the above proposal, it is assumed that the TX UE and each RX UE and PC5 RRC connection for unicast are established or established, when the TX UE in the group establishes a PC5 RRC connection with all RX UEs, the RX UE may be configured to operate using the option 2 scheme. As above, when a PC5 RRC connection is established between the TX UE and all RX UEs, the TX UE may identify the HARQ feedback resource for each RX UE, and may signal HARQ feedback resource information to each RX UE through a PC5 RRC message.

Also, for example, if PC5 RRC connection(s) is(are) established between a TX UE and RX UE(s), The RX UE(s) may determine by itself whether the RX UE(s) may perform groupcast HARQ feedback based on the option 2 scheme. For example, when a PC5 RRC connection is established between a TX UE and RX UEs, whether or not the RX UE performs groupcast HARQ feedback based on the option 2 scheme may be a UE implementation.

Conversely, for example, if a PC5 RRC connection is not established between an RX UE and a TX UE, the RX UE may be pre-configured to transmit a HARQ feedback in an option 1 manner. Therefore, if a PC5 RRC connection is not established between the RX UE and the TX UE, the RX UE may transmit the HARQ feedback to the TX UE in an option 1 manner. Here, it may be assumed that the pre-configuration includes common HARQ feedback resource information. That is, a common HARQ feedback resource may be pre-configured for the RX UE. According to the above scheme, if an RX UE joins the group, and if the PC5 RRC connection between the RX UE and a TX UE in the group is not established, the RX UE may perform HARQ feedback to the TX UE based on a HARQ feedback resource predefined through pre-configuration. For example, according to the above scheme, since the PC5 RRC connection between RX UE 5 and TX UE 1 in FIG. 15 is not established, the RX UE 5 may perform 'NACK only' transmission to the TX UE 1 based on a predefined HARQ feedback resource. For example, the 'NACK only' transmission method is a transmission method that when a PSSCH is successfully decoded, the receiving UE does not transmit a HARQ ACK to the transmitting UE, and the receiving UE transmits the HARQ NACK to the transmitting UE only when the PSSCH is not successfully decoded. That is, in the state that the PC5 RRC connection between the RX UE 5 and the TX UE 1 is not established, only when the RX UE 5 does not receive data transmitted by the TX UE 1, the RX UE 5 may transmit a HARQ NACK to the TX UE 1 based on a pre-defined or pre-configured HARQ feedback resource. On the other hand, when the RX UE 5 receives data transmitted by the TX UE 1, the RX UE 5 may not perform HARQ feedback for the TX UE 1.

Figure 16:
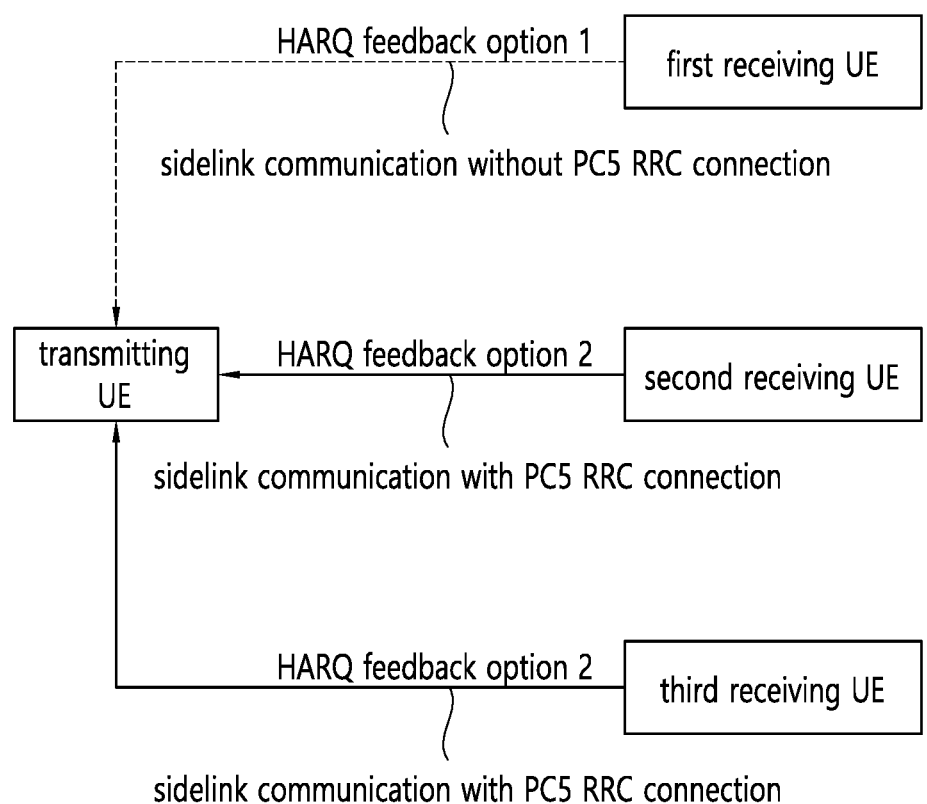
FIG. 16 shows an example in which a UE performing groupcast communication determines an HARQ feedback option according to an embodiment of the present disclosure.

FIG. 16 shows an example in which a UE performing groupcast communication determines an HARQ feedback option according to an embodiment of the present disclosure. The embodiment of FIG. 16 may be combined with various embodiments of the present disclosure.

Referring to FIG. 16, a transmitting UE may perform groupcast communication with a first receiving UE, a second receiving UE, and a third receiving UE. For example, there may be no PC5 RRC connection between the transmitting UE and the first receiving UE. For example, there may be a PC5 RRC connection between the transmitting UE and the first receiving UE and between the transmitting UE and the second receiving UE, respectively. For example, since there is no PC5 RRC connection between the transmitting UE and the first receiving UE, the first receiving UE may perform HARQ feedback according to HARQ feedback option 1. For example, since there is a PC5 RRC connection between the transmitting UE and the second receiving UE, the second receiving UE may perform HARQ feedback according to HARQ feedback option 2. For example, since there is a PC5 RRC connection between the transmitting UE and the third receiving UE, the third receiving UE may perform HARQ feedback according to HARQ feedback option 2.

For example, according to the method described above, an RX UE may determine an option for performing groupcast HARQ feedback among the options 1 and 2, and the RX UE may transmit HARQ feedback for a TX UE according to the determined option. Therefore, the TX UE may have to blindly monitor/decode both the HARQ feedback resources allocated to the RX UEs in the group for option 2 and the common HARQ feedback resource for option 1.

For example, in this way, even if a PC5 RRC connection (or a mechanism for sending and receiving groupcast-related AS layer settings) is established/applied between UEs, (and/or even if the UE determines the option for performing HARQ feedback according to whether or not PC5 RRC is connected, as in the above-mentioned scheme), a UE may configure different options for performing HARQ feedback according to service type/priority, destination ID, and the like. For example, a specific UE in the group that has established an RRC connection with the TX UE may perform HARQ feedback transmission in the option 1 method according to the service type/priority or destination ID to be transmitted. That is, despite the fact that a specific UE in the group has established an RRC connection with the TX UE, a specific UE in the group may not perform HARQ feedback transmission in the option 2 method according to the service type/priority or destination ID to be transmitted. More specifically, for example, through the above method, the RX UE knew that it was in an RRC connection state with the TX UE performing groupcast transmission within the group, and tried to transmit in the option 2 method, but the RX UE may ignore the pre-configuration according to the type, priority or destination ID of the service to be transmitted after the RX UE transmits the HARQ feedback. And, the RX UE may transmit HARQ feedback in the option 1 scheme.

For example, the pre-configuration information may be information pre-defined in a UE. Or, for example, the pre-configuration information may be included in system information transmitted or broadcast by a base station. In addition, if a TX UE selects the option for performing the HARQ feedback, the TX UE may explicitly transmit an indication for a specific option selected by the TX UE to an RX UE. For example, when the TX UE selects the option for performing the HARQ feedback, a TX UE may explicitly inform an RX UE of the specific option selected by the TX UE through SCI on a PSCCH. For example, the SCI may include information on an option for performing HARQ feedback selected by the TX UE. Or, if a TX UE selects the option for performing the HARQ feedback, it may be defined so that an RX UE can implicitly know the option for performing the HARQ feedback selected by the TX UE.

According to an embodiment of the present invention, there is no need to establish an additional mechanism for independently allocating HARQ feedback resources for all RX UEs in a group by a TX UE in groupcast communication. In addition, in connectionless groupcast communication without connection with all RX UEs in the group, through the above scheme, HARQ feedback operation between UEs without an RRC connection with a TX UE may be pre-defined.

According to an embodiment of the present disclosure, in the case of mode 1 UE in NR V2X, a base station may select the groupcast HARQ feedback option. For example, a TX UE may have to transmit assistance information to a base station so that the base station can select the HARQ feedback option. For example, the help information may include information related to whether there is a connection between the TX UE and other UEs participating in the groupcast. For example, the connection between the TX UE and other UEs participating in the groupcast may include a PC5 RRC connection and/or a PC5 S connection. When it is determined that a Mode 1 UE is performing connection-based groupcast with all other UEs based on the help information, a base station may select option 2 and/or instruct the Mode 1 UE to select option 2. And/or the base station may schedule the option 2 feedback resource. On the other hand, for example, if it is determined based on the help information that a Mode 1 UE is not performing a connection-based groupcast with all other UEs, a base station may select option 1 and/or instruct the Mode 1 UE to select option 1. And/or the base station may schedule the option 1 feedback resource. If, for example, it is an overhead to report whether a UE is connected to all UEs, the UE may report an indication of whether its groupcast communication is connection-based groupcast communication or connectionless groupcast communication to a base station, and may perform the subsequent operation accordingly.

Figure 17:
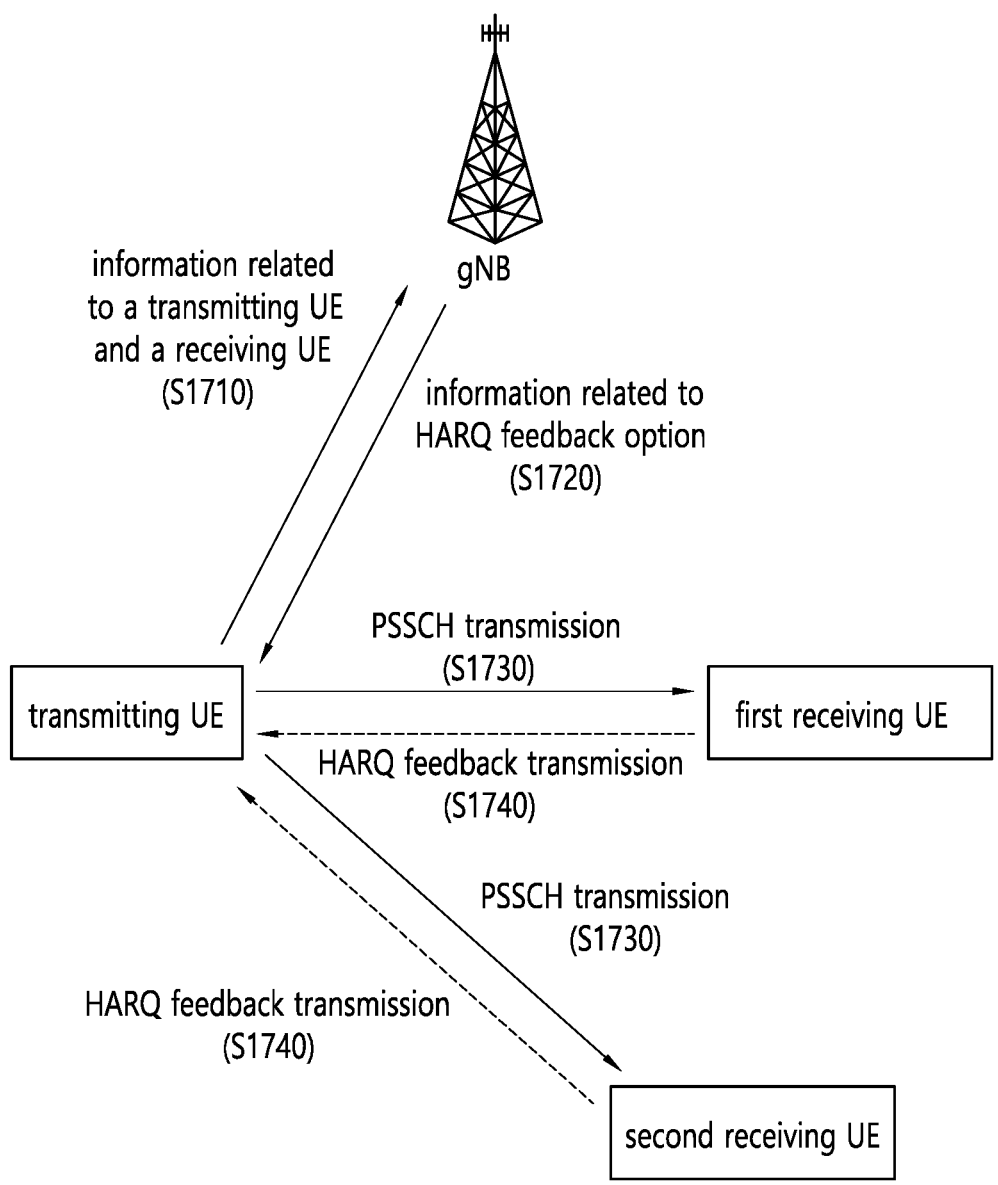
FIG. 17 shows a procedure for performing HARQ feedback by a UE performing groupcast communication according to an embodiment of the present disclosure.

FIG. 17 shows a procedure for performing HARQ feedback by a UE performing groupcast communication according to an embodiment of the present disclosure. The embodiment of FIG. 17 may be combined with various embodiments of the present disclosure.

Referring to FIG. 17, a transmitting UE may perform groupcast communication with a first receiving UE and a second receiving UE. In step S1710, the transmitting UE may transmit information related to the transmitting UE and the receiving UEs to the base station. For example, information related to the transmitting UE and the receiving UEs may include help information. For example, based on the received information, the base station may select a HARQ feedback option related to the groupcast or determine that the transmitting UE and the receiving UE select a specific HARQ feedback option. In step S1720, the base station may transmit information related to the HARQ feedback option to the transmitting UE. For example, the information related to the HARQ feedback option may include the specific HARQ feedback option determined by the base station or information instructing the transmitting UE and the receiving UE to select a specific HARQ feedback option.

For example, if the information related to the HARQ feedback option includes the specific HARQ feedback option selected by the base station, in step S1730, the transmitting UE may transmit the HARQ feedback option together with the PSSCH to the first receiving UE and/or the second receiving UE, based on the information related to the HARQ feedback option. In step S1740, the first receiving UE may perform HARQ feedback according to the HARQ feedback option. And/or, in step S1740, the second receiving UE may perform HARQ feedback according to the HARQ feedback option.

For example, if the information related to the HARQ feedback option includes information instructing the transmitting UE and the receiving UE to select a specific HARQ feedback option, in step S1730, the transmitting UE may transmit information instructing each receiving UE to select a specific HARQ feedback option to the first receiving UE and/or the second receiving UE together with a PSSCH. For example, in step S1730, the first receiving UE may select the HARQ feedback option that the base station instructed the first receiving UE to select, and may perform HARQ feedback according to the HARQ feedback option. And/or, in step S1730, the second receiving UE may select the HARQ feedback option indicated by the base station to select the second receiving UE, and may perform HARQ feedback according to the HARQ feedback option.

According to an embodiment of the present disclosure, in the case of HARQ feedback option 2, a method for classifying feedback resources of each RX UE may be required. Accordingly, the following method is proposed. For example, there may be two options of options 1 and 2 for the operation of transmitting the HARQ feedback in the NR V2X groupcast. In the case of option 2, all RX UEs in the group may have to be allocated a separate HARQ feedback resource. For example, when option 2 is used, it may be expected that the general view is that option 2 may be used in a state in which a unicast link is connected between a TX UE and an RX UE in a group. Here, for example, the state in which the unicast link is connected may include at least one of a state that PC5 RRC connection established between the TX UE and the RX UE, a state that PC5 S connection established between the TX UE and the RX UE, and/or a state in which PC5 RRC messages can be exchanged between the TX UE and the RX UE. For example, in the case of option 2, a method for classifying the feedback resources of each RX UE in the HARQ feedback resource set may be required.

For example, a TX UE and an RX UE may exchange a unicast-related control message through a unicast PC5 RRC message between the TX UE and the RX UE. For example, the TX UE may transmit a configuration for groupcast that is not related to unicast to the RX UE. At this time, a specific ID (or index) for the purpose of specifying the UE may be in included in the configuration for the groupcast. For example, independent HARQ feedback resources of RX UEs in a group may be distinguished based on the ID (or index).

For example, the specific ID (or index) may be information related to indication related to which resource the UE should use to perform HARQ feedback within a predefined HARQ resource set when performing groupcast communication.

For example, a predefined HARQ resource set may be implicitly linked to groupcast data transmitted by a TX UE and configured. For example, the predefined HARQ resource set may be configured as a resource set related to a specific symbol of a slot that appears N slots after data is received. Alternatively, for example, a predefined HARQ resource set may be designated by scheduling information for scheduling groupcast data. For example, the scheduling information may include SCI.

For example, the ID (or index) may be an index newly allocated by the TX UE to identify feedback resources of the RX UEs. When the HARQ resource set is determined for this operation, the TX UE may divide the resource belonging to the set into a plurality of HARQ feedback resources according to a predetermined rule, may index the divided HARQ feedback resource in order or according to a predetermined rule. Additionally, for example, an RX UE may divide the resource belonging to the corresponding set into a plurality of HARQ feedback resources according to a predetermined rule, may index the divided HARQ feedback resource in order or according to a predetermined rule.

Alternatively, for example, the ID (or index) may be a part of an application layer ID and a GeoNetworking Address defined in a UE upper application layer. For example, the geonetworking address may include the MAC address of the apparatus. Alternatively, for example, the ID (or index) may be an index linked to the application layer ID and/or geonetworking address. For this method, the TX UE may independently allocate a plurality of HARQ resources in the HARQ feedback resource set to each RX UE in association with the ID of each RX UE. Specifically, for example, a TX UE may know and manage the ID (application layer ID or geonetworking ID) of RX UEs in the group, a TX UE may distinguish each HARQ resource by interworking with the ID when dividing the divided HARQ resource. For example, each RX UE may use a resource corresponding to the ID among a plurality of HARQ feedback resources as its HARQ feedback resource based on the ID.

Figure 18:
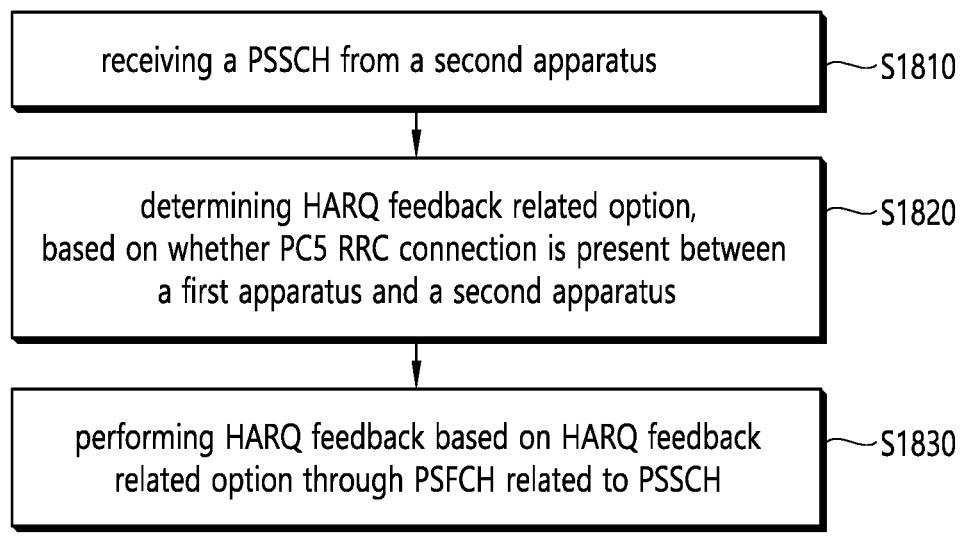
FIG. 18 shows a procedure in which a first apparatus performs HARQ feedback, according to an embodiment of the present disclosure.

According to an embodiment of the present disclosure, the proposed method may be applied to a UE performing channel coding in a sidelink. FIG. 18 shows a procedure in which a first apparatus performs HARQ feedback, according to an embodiment of the present disclosure. FIG. 18 may be combined with various embodiments of the present disclosure.

Referring to FIG. 18, in step S1810, a first apparatus may receive a PSSCH from a second apparatus. In step S1820, the first apparatus may determine an option related to HARQ feedback based on whether a PC5 RRC connection exists between the first apparatus and the second apparatus. In step S1830, the first apparatus may perform the HARQ feedback through a PSFCH related to the PSSCH, based on the option related to the HARQ feedback. For example, the option related to the HARQ feedback is determined from among a first HARQ feedback option or a second HARQ feedback option. For example, based on the existence of the PC5 RRC connection, the option related to the HARQ feedback may be determined as the second HARQ feedback option. For example, based on the absence of the PC5 RRC connection, the option related to the HARQ feedback may be determined as the first HARQ feedback option.

For example, regardless of the existence of the PC5 RRC connection, the HARQ feedback option may be determined by the first apparatus.

Additionally, for example, the first apparatus may receive an RRC message from the second apparatus. Alternatively, the second apparatus may receive an RRC message from the first apparatus. For example, a resource used for the HARQ feedback may be determined based on a resource related to the PSSCH and the RRC message.

For example, the RRC message may include access stratum (AS) configuration.

For example, the RRC message may include information related to the resource used for the HARQ feedback, and information related to the resource used for the HARQ feedback may include at least one of frequency information of the resource used for the HARQ feedback, time information of the resource used for the HARQ feedback, and/or a resource identifier (ID) related to the resource used for the HARQ feedback.

For example, the RRC message may include information related to groupcast communication.

For example, the information related to the groupcast may include information related to a resource used for the HARQ feedback.

For example, the RRC message may further include information related to the first apparatus. For example, the resource used for the HARQ feedback may be determined based on the resource related to the PSSCH and the information related to the first apparatus.

For example, the information related to the first apparatus may be defined by an application layer.

For example, regardless of the existence of the PC5 RRC connection, the HARQ feedback option may be determined as the first HARQ feedback option based on information related to the first apparatus, and the information related to the first apparatus may include at least one of a type of service to be transmitted by the first apparatus, a priority of a message to be transmitted by the first apparatus, and/or a destination ID related to the first apparatus.

Additionally, for example, the first apparatus may receive information related to a common HARQ feedback resource from a base station.

The above-described embodiment may be applied to various apparatuses to be described below. For example, a processor 102 of a first apparatus 100 may control a transceiver 106 to receive a PSSCH from a second apparatus 200. In addition, the processor 102 of the first apparatus 100 may determine an option related to HARQ feedback based on whether a PC5 RRC connection exists between the first apparatus and the second apparatus. In addition, the processor 102 of the first apparatus 100 may perform the HARQ feedback through a PSFCH related to the PSSCH, based on the option related to the HARQ feedback.

According to an embodiment of the present disclosure, a first apparatus for performing wireless communication may be provided. The first apparatus may comprise one or more memories storing instructions; one or more transceivers; and one or more processors connected to the one or more memories and the one or more transceivers. For example, the one or more processors execute the instructions to: receive a PSSCH from a second apparatus; determine an option related to HARQ feedback based on whether a PC5 RRC connection exists between the first apparatus and the second apparatus; and perform the HARQ feedback through a PSFCH related to the PSSCH, based on the option related to the HARQ feedback. For example, the option related to the HARQ feedback may be determined from among a first HARQ feedback option or a second HARQ feedback option.

According to an embodiment of the present disclosure, an apparatus configured to control a first user equipment (UE) may be proposed. For example, the apparatus may comprise: one or more processors; and one or more memories operably connectable to the one or more processors and storing instructions. For example, the one or more processors may execute the instructions to: receive a PSSCH from a second UE; determine an option related to HARQ feedback based on whether a PC5 RRC connection exists between the first UE and the second UE; and perform the HARQ feedback through a PSFCH related to the PSSCH, based on the option related to the HARQ feedback. For example, the option related to the HARQ feedback may be determined from among a first HARQ feedback option or a second HARQ feedback option.

According to an embodiment of the present disclosure, a non-transitory computer-readable storage medium storing instructions may be proposed. For example, when executed, the instructions may cause a first apparatus to: receive a PSSCH from a second apparatus; determine an option related to HARQ feedback based on whether a PC5 RRC connection exists between the first apparatus and the second apparatus; and perform the HARQ feedback through a PSFCH related to the PSSCH, based on the option related to the HARQ feedback. For example, the option related to the HARQ feedback may be determined from among a first HARQ feedback option or a second HARQ feedback option.

FIG. 19 shows a procedure in which a second apparatus receives HARQ feedback, according to an embodiment of the present disclosure. The embodiment of FIG. 19 may be combined with various embodiments of the present disclosure.

Referring to FIG. 19, in step S1910, a second apparatus may transmit a PSSCH to a first apparatus. For example, an option of the HARQ feedback may be determined based on a PC5 RRC connection related to the first apparatus and the second apparatus.

Additionally, for example, the second apparatus may transmit information related to a connection between the first apparatus and the second apparatus to a base station; and receive information related to the option of the HARQ feedback from the base station. For example, the information related to the connection between the first apparatus and the second apparatus may include information related to a PC5 RRC connection related to the first apparatus and the second apparatus or information related to a PC5 S connection related to the first apparatus and the second apparatus, and the option of the HARQ feedback may be determined based on the information related to the option of the HARQ feedback, regardless of the existence of the PC5 RRC connection.

The above-described embodiment may be applied to various apparatuses to be described below. For example, a processor 202 of a second apparatus 200 may control a transceiver 206 to transmit a PSSCH to a first apparatus 100.

According to an embodiment of the present disclosure, a second apparatus for performing wireless communication may be provided. The second apparatus may comprise one or more memories storing instructions; one or more transceivers; and one or more processors connected to the one or more memories and the one or more transceivers. For example, the one or more processors execute the instructions to: transmit a PSSCH to a first apparatus. For example, an option of the HARQ feedback may be determined based on a PC5 RRC connection related to the first apparatus and the second apparatus.

Additionally, for example, the one or more processor may execute the instructions to transmit information related to a connection between the first apparatus and the second apparatus to a base station; and receive information related to the option of the HARQ feedback from the base station. For example, the information related to the connection between the first apparatus and the second apparatus may include information related to a PC5 RRC connection related to the first apparatus and the second apparatus or information related to a PC5 S connection related to the first apparatus and the second apparatus, and the option of the HARQ feedback may be determined based on the information related to the option of the HARQ feedback, regardless of the existence of the PC5 RRC connection.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 20:
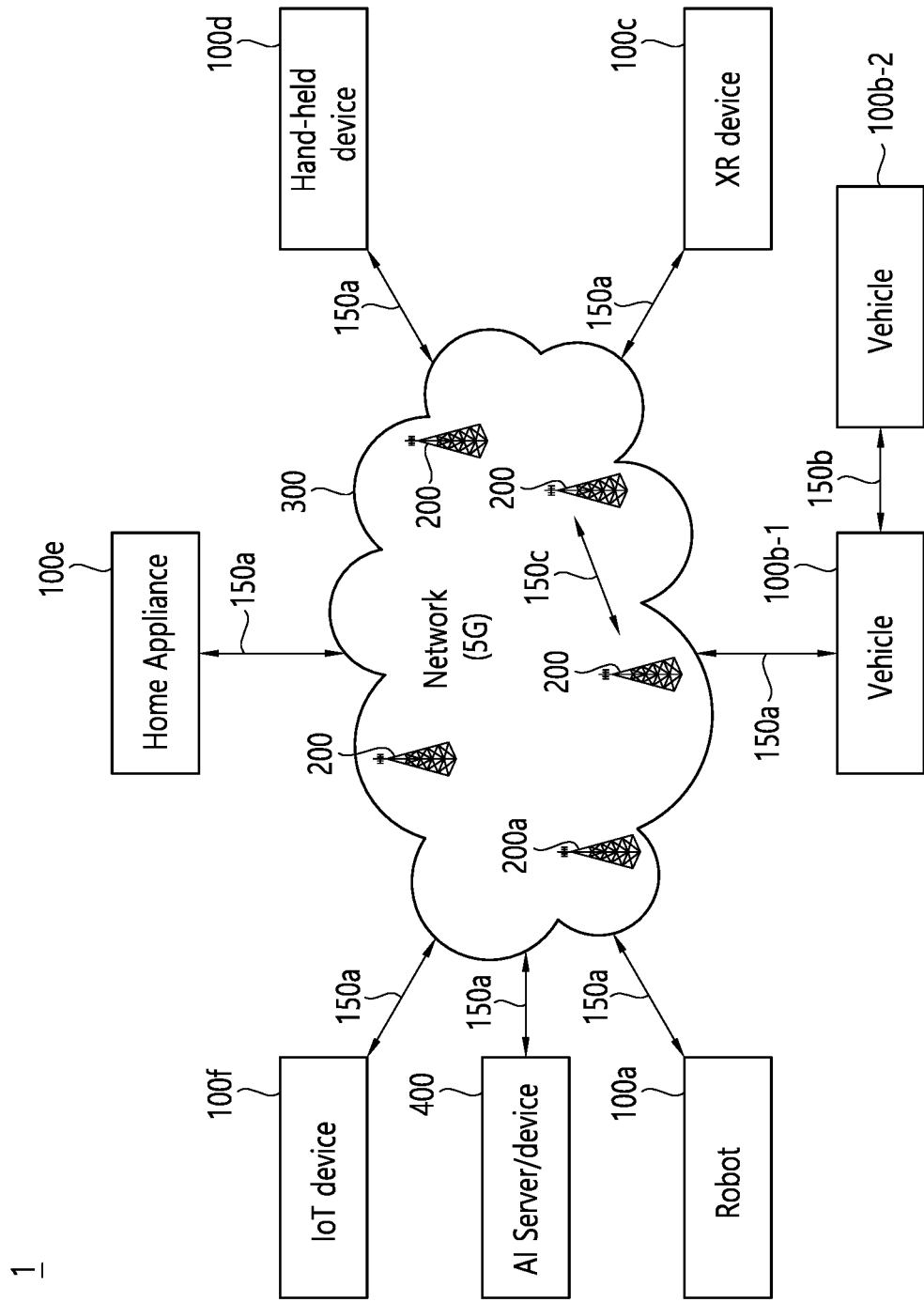
FIG. 20 shows a communication system 1, in accordance with an embodiment of the present disclosure.

FIG. 20 shows a communication system 1, in accordance with an embodiment of the present disclosure.

Referring to FIG. 20, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 21:
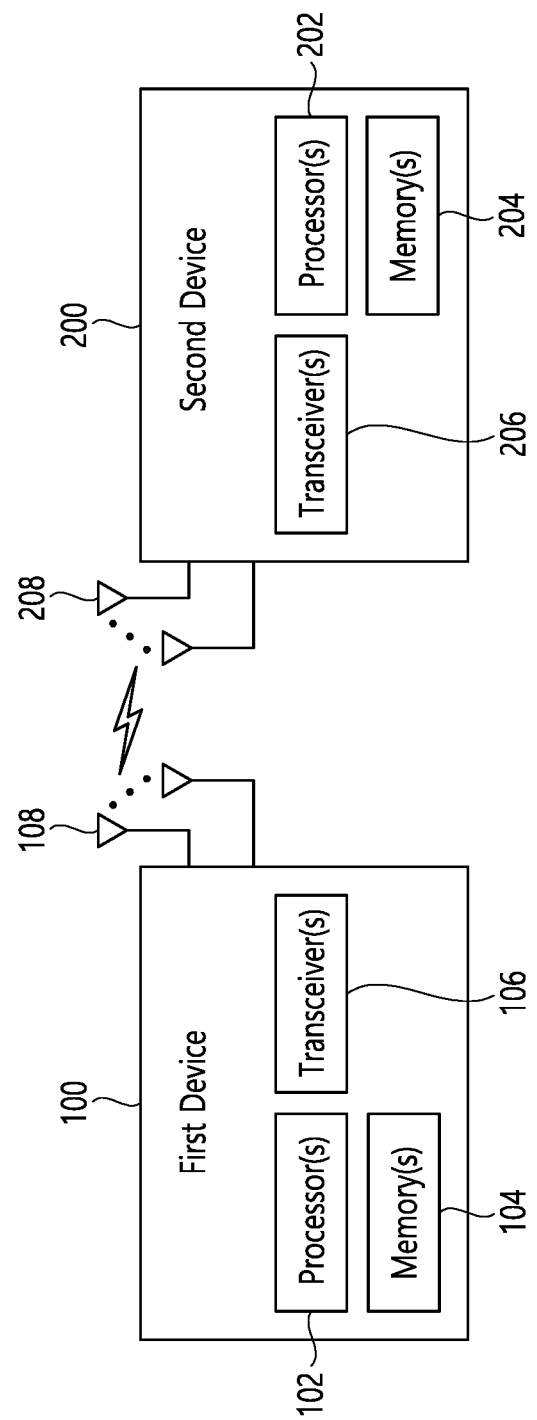
FIG. 21 shows wireless devices, in accordance with an embodiment of the present disclosure.

FIG. 21 shows wireless devices, in accordance with an embodiment of the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 22:
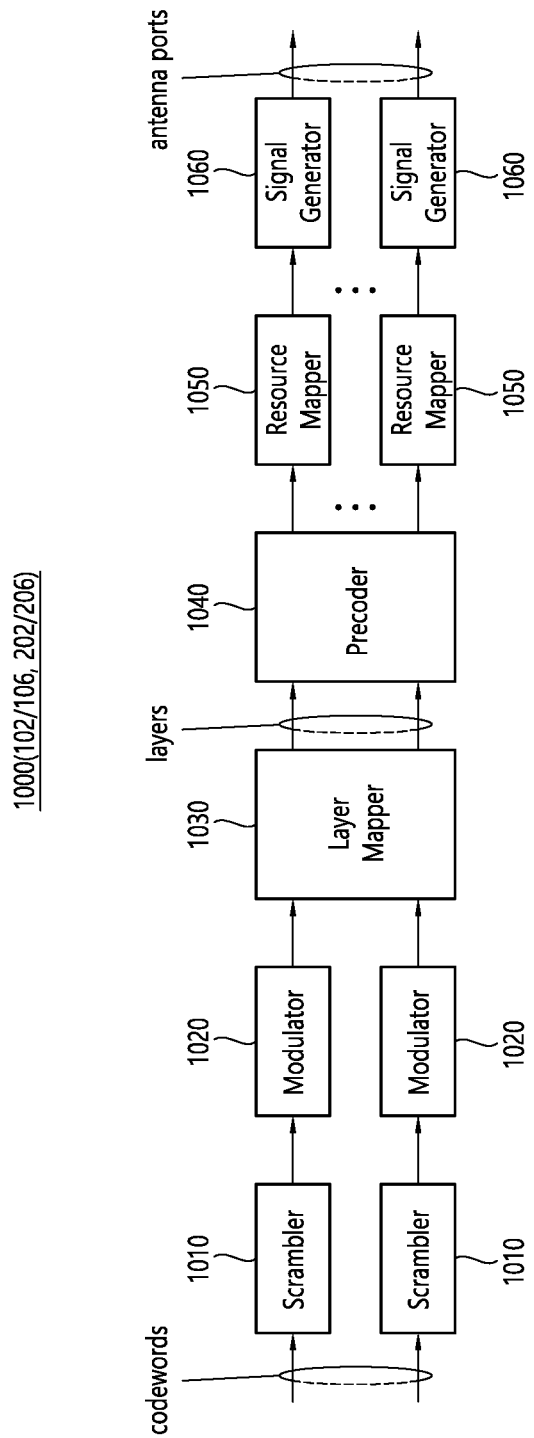
FIG. 22 shows a signal process circuit for a transmission signal, in accordance with an embodiment of the present disclosure.

FIG. 22 shows a signal process circuit for a transmission signal, in accordance with an embodiment of the present disclosure.

Referring to FIG. 22, a signal processing circuit 1000 may include scramblers 1010, modulators 1020, a layer mapper 1030, a precoder 1040, resource mappers 1050, and signal generators 1060. An operation/function of FIG. 22 may be performed, without being limited to, the processors 102 and 202 and/or the transceivers 106 and 206 of FIG. 21. Hardware elements of FIG. 22 may be implemented by the processors 102 and 202 and/or the transceivers 106 and 206 of FIG. 21. For example, blocks 1010 to 1060 may be implemented by the processors 102 and 202 of FIG. 21. Alternatively, the blocks 1010 to 1050 may be implemented by the processors 102 and 202 of FIG. 21 and the block 1060 may be implemented by the transceivers 106 and 206 of FIG. 21.

Codewords may be converted into radio signals via the signal processing circuit 1000 of FIG. 22. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 22. For example, the wireless devices (e.g., 100 and 200 of FIG. 21) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 23:
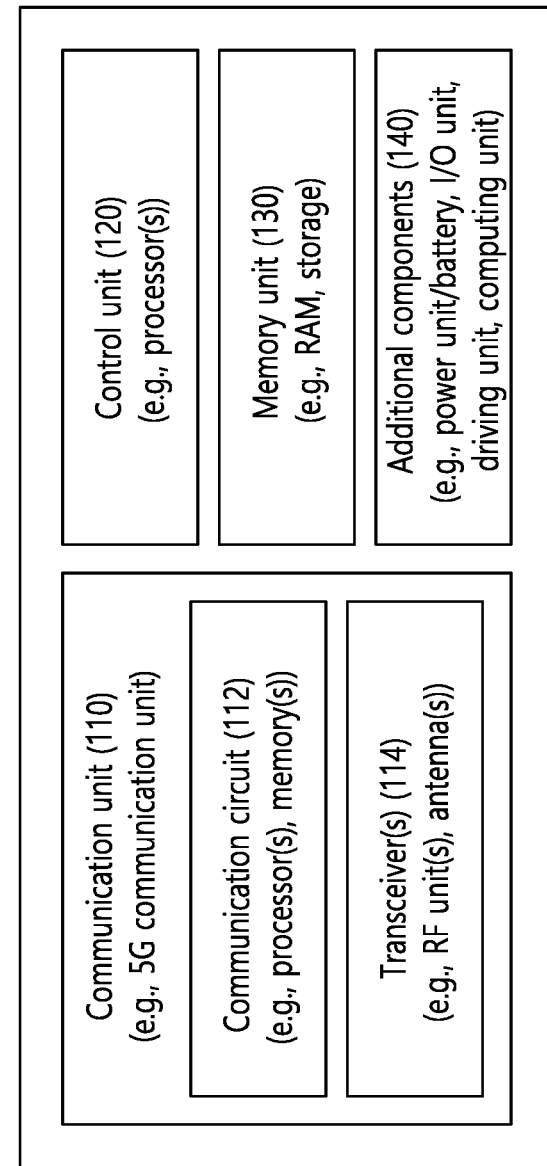
FIG. 23 shows a wireless device, in accordance with an embodiment of the present disclosure.

FIG. 23 shows another example of a wireless device, in accordance with an embodiment of the present disclosure. The wireless device may be implemented in various forms according to a use-case/service (refer to FIG. 20).

Referring to FIG. 23, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 20), the vehicles (100b-1 and 100b-2 of FIG. 20), the XR device (100c of FIG. 20), the hand-held device (100d of FIG. 20), the home appliance (100e of FIG. 20), the IoT device (100f of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, etc. The wireless device may be used in a mobile or fixed place according to a use-example/service.

In FIG. 23, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 23 will be described in detail with reference to the drawings.

Figure 24:
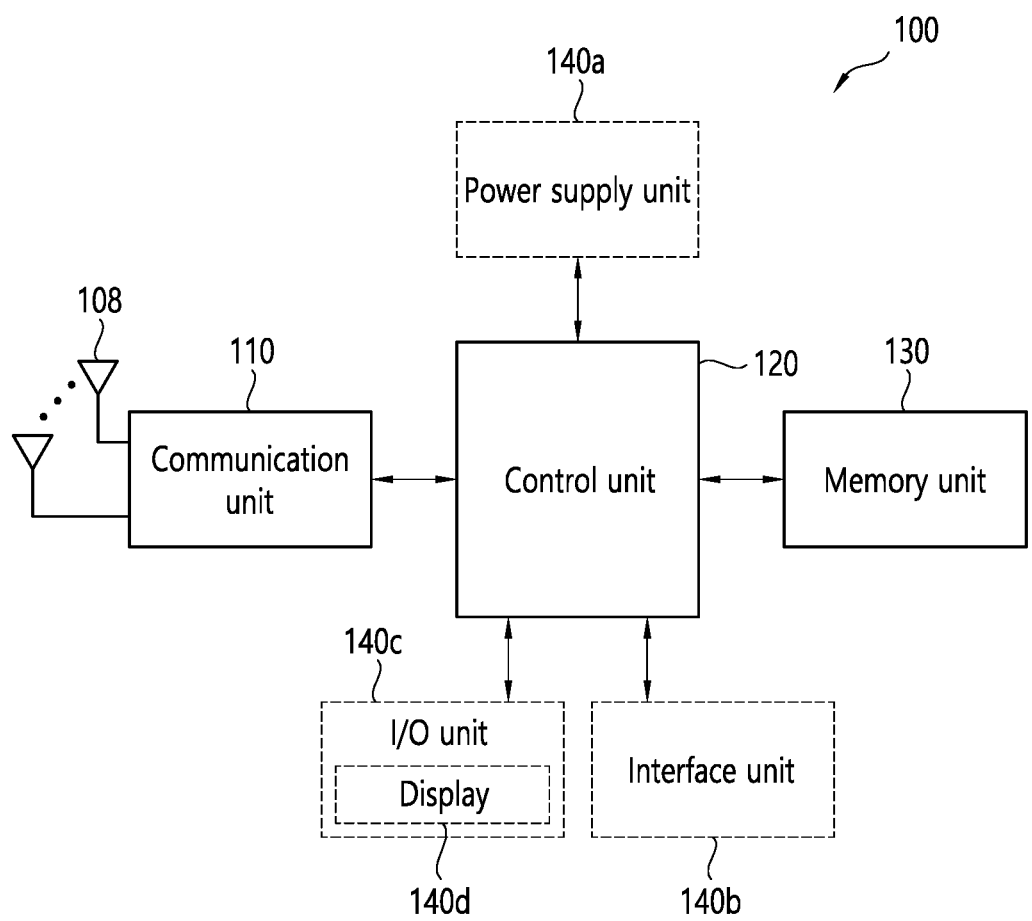
FIG. 24 shows a hand-held device, in accordance with an embodiment of the present disclosure.

FIG. 24 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 24, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/ signals stored in the memory into radio signals and transmit the converted radio signals to other wireless devices directly or to a BS. The communication unit 110 may receive radio signals from other wireless devices or the BS and then restore the received radio signals into original information/ signals. The restored information/signals may be stored in the memory unit 130 and may be output as various types (e.g., text, voice, images, video, or haptic) through the I/O unit 140c.

Figure 25:
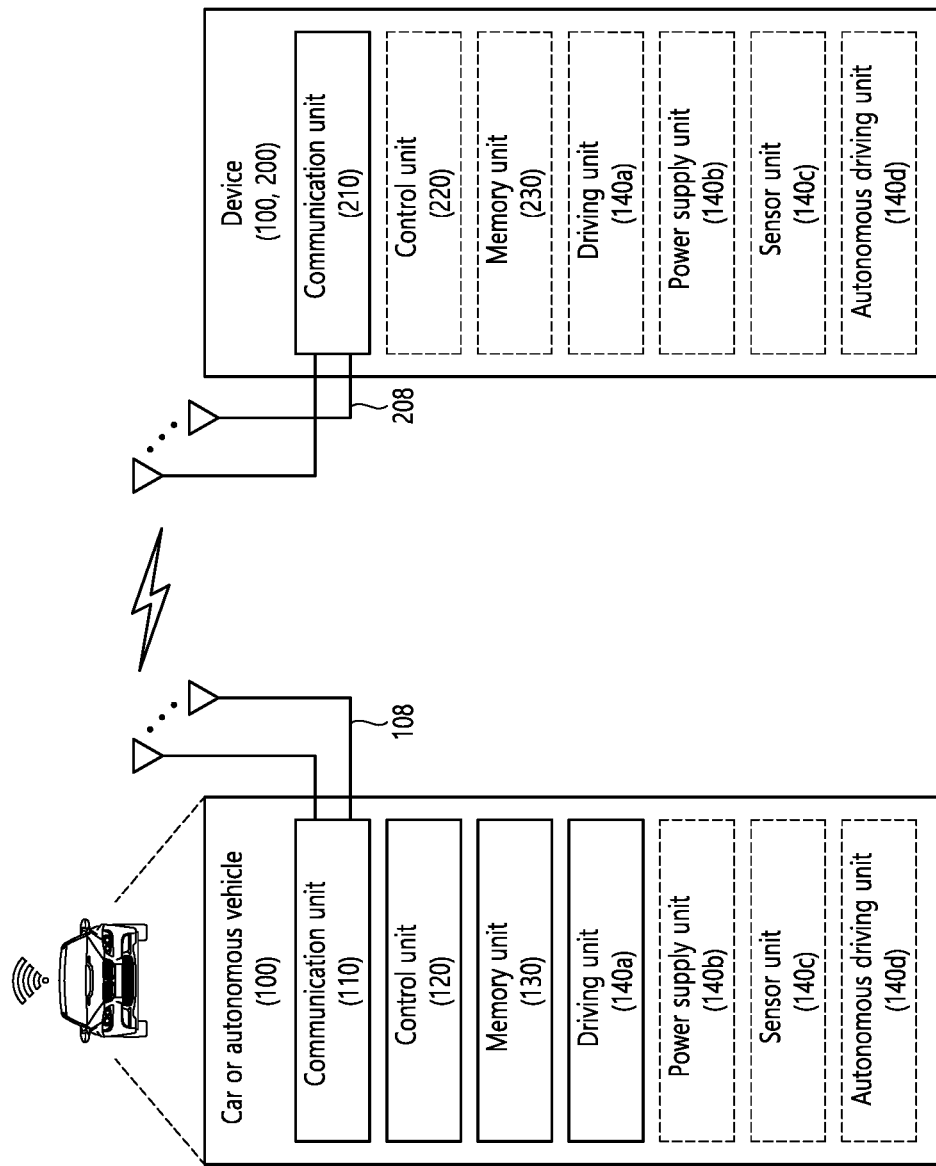
FIG. 25 shows a car or an autonomous vehicle, in accordance with an embodiment of the present disclosure.

FIG. 25 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 25, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 23, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is configured, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for transmitting, by a first apparatus, a hybrid automatic repeat request (HARQ) feedback, the method comprising:
   receiving a physical sidelink shared channel (PSSCH) from a second apparatus;
   determining an option related to HARQ feedback based on whether a PC5 radio resource control (RRC) connection exists between the first apparatus and the second apparatus; and
   performing the HARQ feedback through a physical sidelink feedback channel (PSFCH) related to the PSSCH, based on the option related to the HARQ feedback,
   wherein the option related to the HARQ feedback is determined from among a first HARQ feedback option or a second HARQ feedback option.

2. The method of claim 1, wherein based on the existence of the PC5 RRC connection, the option related to the HARQ feedback is determined as the second HARQ feedback option.

3. The method of claim 1, wherein based on the absence of the PC5 RRC connection, the option related to the HARQ feedback is determined as the first HARQ feedback option.

4. The method of claim 1, wherein regardless of the existence of the PC5 RRC connection, the HARQ feedback option is determined by the first apparatus.

5. The method of claim 1, further comprising:
   receiving an RRC message from the second apparatus,
   wherein a resource used for the HARQ feedback is determined based on a resource related to the PSSCH and the RRC message.

6. The method of claim 5, wherein the RRC message includes access stratum (AS) configuration.

7. The method of claim 5, wherein the RRC message includes information related to the resource used for the HARQ feedback, and
   wherein information related to the resource used for the HARQ feedback includes at least one of frequency information of the resource used for the HARQ feedback, time information of the resource used for the HARQ feedback, or a resource identifier (ID) related to the resource used for the HARQ feedback.

8. The method of claim 5, wherein the RRC message includes information related to groupcast communication.

9. The method of claim 8, wherein the information related to the groupcast includes information related to a resource used for the HARQ feedback.

10. The method of claim 8, wherein the RRC message further includes information related to the first apparatus, and
wherein the resource used for the HARQ feedback is determined based on the resource related to the PSSCH and the information related to the first apparatus.

11. The method of claim 10, wherein the information related to the first apparatus is defined by an application layer.

12. The method of claim 1, wherein regardless of the existence of the PC5 RRC connection, the HARQ feedback option is determined as the first HARQ feedback option based on information related to the first apparatus, and
wherein the information related to the first apparatus includes at least one of a type of service to be transmitted by the first apparatus, a priority of a message to be transmitted by the first apparatus, or a destination ID related to the first apparatus.

13. The method of claim 1, further comprising:
receiving information related to a common HARQ feedback resource from a base station.

14. A first apparatus for performing wireless communication, the first apparatus comprising:
one or more memories storing instructions;
one or more transceivers; and
one or more processors connected to the one or more memories and the one or more transceivers, wherein the one or more processors execute the instructions to:
receive a physical sidelink shared channel (PSSCH) from a second apparatus;
determine an option related to HARQ feedback based on whether a PC5 radio resource control (RRC) connection exists between the first apparatus and the second apparatus; and
perform the HARQ feedback through a physical sidelink feedback channel (PSFCH) related to the PSSCH, based on the option related to the HARQ feedback,
wherein the option related to the HARQ feedback is determined from among a first HARQ feedback option or a second HARQ feedback option.

15. An apparatus configured to control a first user equipment (UE), the apparatus comprising:
one or more processors; and
one or more memories operably connectable to the one or more processors and storing instructions, wherein the one or more processors execute the instructions to:
receive a physical sidelink shared channel (PSSCH) from a second UE;
determine an option related to HARQ feedback based on whether a PC5 radio resource control (RRC) connection exists between the first UE and the second UE; and
perform the HARQ feedback through a physical sidelink feedback channel (PSFCH) related to the PSSCH, based on the option related to the HARQ feedback,
wherein the option related to the HARQ feedback is determined from among a first HARQ feedback option or a second HARQ feedback option.

* * * * *